US012558612B2

(12) United States Patent
O'Connor

(10) Patent No.: US 12,558,612 B2
(45) Date of Patent: *Feb. 24, 2026

(54) UNIVERSAL MOBILE GAME CONTROLLER

(71) Applicant: Backbone Labs, Inc., Vancouver, WA (US)

(72) Inventor: Shawn O'Connor, Portland, OR (US)

(73) Assignee: Backbone Labs, Inc., Vancouver, WA (US)

( * ) Notice: Subject to any disclaimer, the term of this patent is extended or adjusted under 35 U.S.C. 154(b) by 287 days.

This patent is subject to a terminal disclaimer.

(21) Appl. No.: 18/237,680

(22) Filed: Aug. 24, 2023

(65) Prior Publication Data

US 2024/0207721 A1     Jun. 27, 2024

Related U.S. Application Data

(60) Provisional application No. 63/524,014, filed on Jun. 29, 2023, provisional application No. 63/435,089, filed on Dec. 23, 2022.

(51) Int. Cl.
*A63F 13/22* (2014.01)
*A63F 13/23* (2014.01)

(52) U.S. Cl.
CPC .............. *A63F 13/22* (2014.09); *A63F 13/23* (2014.09)

(58) Field of Classification Search
CPC .................................................... A63F 13/22
See application file for complete search history.

(56) References Cited

U.S. PATENT DOCUMENTS

| | | | |
|---|---|---|---|
| 3,536,908 A | 10/1970 | Oster | |
| 4,636,593 A | 1/1987 | Novak | |
| 6,238,289 B1 | 5/2001 | Sobota | |
| 6,640,268 B1 | 10/2003 | Kumar | |
| 6,684,062 B1 | 1/2004 | Gosior | |
| 6,736,724 B1 | 5/2004 | Erikawa | |
| 6,761,462 B2 | 7/2004 | Yoshida | |
| 6,965,368 B1 | 11/2005 | Andrews et al. | |
| 7,477,239 B2 | 1/2009 | Ray | |
| 7,580,728 B2 | 8/2009 | Vance et al. | |
| 7,905,627 B2 | 3/2011 | Chiang | |

(Continued)

FOREIGN PATENT DOCUMENTS

| | | |
|---|---|---|
| CA | 3169951 A1 | 9/2021 |
| CN | 101739162 A | 6/2010 |

(Continued)

OTHER PUBLICATIONS

US 12,029,974 B1, 07/2024, Maker (withdrawn)

(Continued)

*Primary Examiner* — Jay Trent Liddle
(74) *Attorney, Agent, or Firm* — Crowell & Moring LLP

(57) ABSTRACT

A universal mobile game controller is provided that can interoperate with multiple computing device operating systems (e.g., Android and iOS) in an automatic way through a common connector (e.g., USB-C). With these embodiments, instead of building a separate mobile game controller for each operating system, a single mobile game controller can be used for all operating systems. These embodiments can also enable communication with an application running within the computing device operating system. Other embodiments are provided.

20 Claims, 22 Drawing Sheets

(56)                References Cited

U.S. PATENT DOCUMENTS

| | | | |
|---|---|---|---|
| 8,462,810 B2 | 6/2013 | Spinar | |
| 8,760,394 B2 | 6/2014 | Chiang | |
| 8,822,851 B2 | 9/2014 | Walker | |
| 8,972,617 B2* | 3/2015 | Hirschman | G06F 3/023 |
| | | | 463/37 |
| 9,053,243 B2 | 6/2015 | Townsend | |
| 9,295,915 B2 | 3/2016 | Bruno | |
| 9,677,740 B2 | 6/2017 | Steiner | |
| 9,848,324 B1 | 12/2017 | Abene | |
| 10,025,644 B2 | 7/2018 | Iwaya et al. | |
| 10,258,876 B2 | 4/2019 | Wells et al. | |
| 10,259,384 B2 | 4/2019 | Teng | |
| 10,300,386 B1 | 5/2019 | Leung et al. | |
| 10,391,393 B2 | 8/2019 | Townley | |
| 10,409,449 B2 | 9/2019 | Takikawa | |
| 10,483,969 B2 | 11/2019 | Kontani | |
| 10,599,233 B1 | 3/2020 | Amalou | |
| 10,725,557 B2 | 7/2020 | Kontani | |
| 10,741,215 B1 | 8/2020 | Sundareson | |
| 10,751,612 B1 | 8/2020 | Urbanus | |
| 10,868,436 B1 | 12/2020 | Chen | |
| 10,893,125 B2 | 1/2021 | Ma | |
| 11,000,759 B2 | 5/2021 | Palmer et al. | |
| 11,027,191 B2 | 6/2021 | Oh | |
| 11,045,723 B1 | 6/2021 | Lee | |
| 11,090,557 B2 | 8/2021 | Downs et al. | |
| 11,105,969 B2 | 8/2021 | Sasagawa | |
| 11,167,209 B2 | 11/2021 | Lu | |
| 11,343,354 B2 | 5/2022 | Parekh | |
| 11,389,721 B2 | 7/2022 | Khaira et al. | |
| 11,395,961 B2 | 7/2022 | Chung | |
| 11,528,363 B2 | 12/2022 | Bohannon | |
| 11,528,987 B1 | 12/2022 | Girault | |
| 11,662,855 B1 | 5/2023 | Sorensen et al. | |
| 11,707,670 B2 | 7/2023 | Khaira et al. | |
| 11,819,756 B2 | 11/2023 | Lu | |
| 11,826,642 B2 | 11/2023 | Khaira et al. | |
| 11,839,810 B2 | 12/2023 | Khaira et al. | |
| 11,853,505 B1 | 12/2023 | Sorensen et al. | |
| 12,028,474 B2* | 7/2024 | O'Leary | H04M 1/72412 |
| 12,064,699 B2 | 8/2024 | Miura | |
| 12,070,678 B2 | 8/2024 | Maker | |
| 12,074,946 B2 | 8/2024 | Wei | |
| 12,115,443 B2 | 10/2024 | Khaira et al. | |
| 12,121,800 B2 | 10/2024 | Maker | |
| 12,145,052 B2 | 11/2024 | Khaira et al. | |
| 12,145,053 B2 | 11/2024 | Khaira et al. | |
| 12,194,374 B2 | 1/2025 | Khaira | |
| 12,263,400 B2 | 4/2025 | Lake et al. | |
| 12,268,956 B2 | 4/2025 | Khaira | |
| 12,274,933 B2* | 4/2025 | Lu | A63F 13/23 |
| 12,285,676 B2 | 4/2025 | Maker | |
| 12,324,983 B2 | 6/2025 | O'Connor | |
| 2001/0027130 A1 | 10/2001 | Namba | |
| 2002/0173354 A1 | 11/2002 | Winans | |
| 2004/0225502 A1 | 11/2004 | Bear | |
| 2005/0017953 A1 | 1/2005 | Pekka | |
| 2005/0172045 A1 | 8/2005 | Bermudez et al. | |
| 2005/0221894 A1 | 10/2005 | Lum | |
| 2005/0243585 A1 | 11/2005 | Marchant | |
| 2005/0247550 A1 | 11/2005 | Hamada | |
| 2006/0132458 A1 | 6/2006 | Garfio | |
| 2006/0152628 A1 | 7/2006 | Park | |
| 2006/0234794 A1 | 10/2006 | Baseflug et al. | |
| 2006/0236002 A1 | 10/2006 | Valenci | |
| 2007/0010328 A1 | 1/2007 | Yokota | |
| 2007/0091633 A1 | 4/2007 | Harrity | |
| 2007/0152965 A1 | 7/2007 | Krzyzanowski | |
| 2007/0155511 A1 | 7/2007 | Grundstedt | |
| 2007/0233291 A1 | 10/2007 | Herde | |
| 2007/0236959 A1 | 10/2007 | Tolbert | |
| 2008/0202907 A1 | 8/2008 | Kyowski | |
| 2008/0294453 A1 | 11/2008 | Baird-Smith | |
| 2009/0065337 A1 | 3/2009 | Chiang | |
| 2009/0077277 A1 | 3/2009 | Vidal | |
| 2009/0219734 A1 | 9/2009 | Sawada | |
| 2009/0284397 A1 | 11/2009 | Lee | |
| 2010/0067424 A1 | 3/2010 | Sun | |
| 2010/0115050 A1 | 5/2010 | Sultenfuss | |
| 2010/0137033 A1 | 6/2010 | Lee | |
| 2010/0271839 A1 | 10/2010 | Chan | |
| 2011/0014984 A1 | 1/2011 | Penman et al. | |
| 2011/0084904 A1 | 4/2011 | Tan | |
| 2012/0145522 A1 | 6/2012 | Lee | |
| 2012/0200475 A1 | 8/2012 | Baker | |
| 2012/0225258 A1 | 9/2012 | Hill | |
| 2012/0284302 A1 | 11/2012 | Takagi | |
| 2013/0033829 A1 | 2/2013 | Furubo et al. | |
| 2013/0077346 A1 | 3/2013 | Chen | |
| 2013/0162680 A1 | 6/2013 | Perry | |
| 2013/0191625 A1 | 7/2013 | Mullens et al. | |
| 2013/0225288 A1 | 8/2013 | Levin et al. | |
| 2013/0237322 A1 | 9/2013 | Sobel | |
| 2013/0298208 A1 | 11/2013 | Ayed | |
| 2014/0018173 A1 | 1/2014 | Urhman | |
| 2014/0024392 A1 | 1/2014 | Su | |
| 2014/0109133 A1 | 4/2014 | Kitazato | |
| 2014/0125619 A1 | 5/2014 | Panther et al. | |
| 2014/0161417 A1 | 6/2014 | Kurupacheril | |
| 2014/0184508 A1 | 7/2014 | Tamasi et al. | |
| 2014/0274394 A1 | 9/2014 | Willis | |
| 2014/0304494 A1 | 10/2014 | Hawver | |
| 2014/0317329 A1 | 10/2014 | Barnett et al. | |
| 2014/0365214 A1 | 12/2014 | Bayley | |
| 2014/0375545 A1 | 12/2014 | Ackerman et al. | |
| 2015/0018101 A1 | 1/2015 | Schoenith | |
| 2015/0031452 A1 | 1/2015 | Rundell | |
| 2015/0128042 A1 | 5/2015 | Churchill et al. | |
| 2015/0217191 A1 | 8/2015 | Yan | |
| 2015/0273325 A1 | 10/2015 | Falc et al. | |
| 2015/0281422 A1 | 10/2015 | Kessler et al. | |
| 2016/0062489 A1 | 3/2016 | Li | |
| 2016/0132114 A1 | 5/2016 | Rihn | |
| 2016/0180811 A1 | 6/2016 | Colenbrander | |
| 2016/0234264 A1 | 8/2016 | Coffman | |
| 2016/0313912 A1 | 10/2016 | Keam | |
| 2016/0317919 A1 | 11/2016 | Gassoway et al. | |
| 2016/0329533 A1 | 11/2016 | Tajima | |
| 2017/0056762 A1 | 3/2017 | Gafni | |
| 2017/0072307 A1 | 3/2017 | Perry | |
| 2017/0142201 A1 | 5/2017 | Holmes | |
| 2017/0173461 A1 | 6/2017 | Pack | |
| 2017/0205881 A1 | 7/2017 | Yamashita | |
| 2017/0239468 A1 | 8/2017 | Lemke | |
| 2017/0340957 A1* | 11/2017 | Cochenour | A63F 13/215 |
| 2018/0004250 A1 | 1/2018 | Barnett et al. | |
| 2018/0056176 A1 | 3/2018 | Sakamoto | |
| 2018/0070389 A1 | 3/2018 | Morgan | |
| 2018/0097860 A1 | 4/2018 | Daly | |
| 2018/0104574 A1* | 4/2018 | Tager | A63F 13/20 |
| 2018/0121655 A1 | 5/2018 | Abene | |
| 2018/0133594 A1 | 5/2018 | Guo | |
| 2018/0250588 A1 | 9/2018 | Winick | |
| 2018/0345136 A1 | 12/2018 | Schmitz et al. | |
| 2018/0345139 A1 | 12/2018 | Smith | |
| 2018/0359246 A1 | 12/2018 | Dannemiller et al. | |
| 2018/0369692 A1 | 12/2018 | Winick | |
| 2019/0079584 A1 | 3/2019 | Bonanno et al. | |
| 2019/0080549 A1 | 3/2019 | Lewis | |
| 2019/0230400 A1 | 7/2019 | Van Os | |
| 2019/0358534 A1 | 11/2019 | Fang et al. | |
| 2019/0379231 A1 | 12/2019 | Gonzalez et al. | |
| 2020/0155928 A1 | 5/2020 | Guo | |
| 2020/0206636 A1 | 7/2020 | Schultz et al. | |
| 2020/0278758 A1 | 9/2020 | McAllen | |
| 2020/0282309 A1 | 9/2020 | Liao | |
| 2020/0353351 A1 | 11/2020 | Mao | |
| 2020/0353369 A1 | 11/2020 | Esselstrom | |
| 2020/0406140 A1 | 12/2020 | Sundareson | |
| 2021/0093951 A1 | 4/2021 | Mahlmeister et al. | |
| 2021/0104907 A1 | 4/2021 | Chen | |
| 2021/0126984 A1 | 4/2021 | Parekh | |
| 2021/0154584 A1 | 5/2021 | O'Connor et al. | |
| 2021/0197082 A1 | 7/2021 | Seibert et al. | |

(56) References Cited

U.S. PATENT DOCUMENTS

| 2021/0200501 A1 | 7/2021 | Stankoulov |
| 2021/0205699 A1 | 7/2021 | Chung |
| 2021/0275907 A1 | 9/2021 | Khaira et al. |
| 2021/0291062 A1 | 9/2021 | Tulewicz |
| 2021/0299553 A1 | 9/2021 | Lu et al. |
| 2021/0308566 A1 | 10/2021 | Kong et al. |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0096923 A1 | 3/2022 | O'Leary et al. |
| 2022/0135273 A1 | 5/2022 | Malone |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2022/0401834 A1 | 12/2022 | Benedetto |
| 2023/0048793 A1 | 2/2023 | Lee |
| 2023/0105605 A1 | 4/2023 | Lu et al. |
| 2023/0136977 A1 | 5/2023 | Miura |
| 2023/0182011 A1 | 6/2023 | Vroom et al. |
| 2023/0211235 A1 | 7/2023 | Xu |
| 2023/0271082 A1 | 8/2023 | Khaira et al. |
| 2023/0356076 A1 | 11/2023 | Maker |
| 2023/0421696 A1 | 12/2023 | Bohannon |
| 2024/0009564 A1 | 1/2024 | Schembri |
| 2024/0042313 A1 | 2/2024 | Benedetto |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |
| 2024/0226721 A1 | 7/2024 | Lake et al. |
| 2024/0307760 A1 | 9/2024 | Aldridge et al. |
| 2024/0333804 A1 | 10/2024 | Wei et al. |
| 2024/0390786 A1 | 11/2024 | Aldridge et al. |
| 2025/0025773 A1 | 1/2025 | Maker |
| 2025/0025776 A1 | 1/2025 | Maker |
| 2025/0032900 A1 | 1/2025 | Khaira |
| 2025/0032901 A1 | 1/2025 | Boegli |
| 2025/0032903 A1 | 1/2025 | Khaira |
| 2025/0032904 A1 | 1/2025 | Khaira |
| 2025/0032913 A1 | 1/2025 | Abe |
| 2025/0041712 A1 | 2/2025 | Khaira |
| 2025/0058213 A1 | 2/2025 | Khaira et al. |
| 2025/0090945 A1 | 3/2025 | Koch et al. |
| 2025/0090946 A1 | 3/2025 | Koch et al. |
| 2025/0090947 A1 | 3/2025 | Khaira et al. |
| 2025/0128152 A1 | 4/2025 | Khaira et al. |
| 2025/0153035 A1 | 5/2025 | Torres et al. |
| 2025/0153045 A1 | 5/2025 | O'Connor et al. |

FOREIGN PATENT DOCUMENTS

| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 109062842 A | 12/2018 |
| CN | 208636809 U | 3/2019 |
| CN | 209392718 U | 9/2019 |
| CN | 113426104 A | 9/2021 |
| CN | 115427123 A | 12/2022 |
| CN | 115427123 B | 2/2024 |
| EP | 1380324 A1 | 1/2004 |
| EP | 1380324 B1 | 9/2005 |
| EP | 2025369 A2 | 2/2009 |
| EP | 2136225 A1 | 12/2009 |
| EP | 2136225 B1 | 6/2012 |
| EP | 3224691 B1 | 4/2018 |
| EP | 3375502 A1 | 9/2018 |
| EP | 3782709 A1 | 2/2021 |
| EP | 4114540 A1 | 1/2023 |
| GB | 2608588 A | 1/2023 |
| JP | 2004139847 A | 5/2004 |
| JP | 2014210079 A | 11/2014 |
| JP | 2023516421 A | 4/2023 |
| TW | 201036020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO 2021/178242 A1 | 9/2021 |
| WO | WO2022/161834 A1 | 8/2022 |
| WO | WO 2023/034596 A1 | 3/2023 |
| WO | WO2023/172202 A1 | 9/2023 |
| WO | WO2024/006587 A1 | 1/2024 |
| WO | WO2024/097301 A1 | 5/2024 |
| WO | WO2024/107651 A1 | 5/2024 |
| WO | WO2024/107654 A2 | 5/2024 |
| WO | WO2024/137106 A1 | 6/2024 |
| WO | WO2024/148214 A1 | 7/2024 |
| WO | WO2024/248845 A1 | 12/2024 |
| WO | WO 2025/029566 A1 | 2/2025 |
| WO | WO2025/042684 A1 | 2/2025 |
| WO | WO2025/058942 A1 | 3/2025 |

OTHER PUBLICATIONS

US 12,047,455 B2, 07/2024, Wei et al. (withdrawn)

Office Action—Communication pursuant to Rules 161(1) and 162 EPC in Europe Application No. 23817600.2, dated Jun. 12, 2025.

Notice of allowance in U.S. Appl. No. 18/076,121, dated Jun. 23, 2025.

International Preliminary Report on Patentability in International Application No. PCT/US2023/081101, mailed Jul. 3, 2025.

International Preliminary Report on Patentability in International Application No. PCT/US2024/010404, mailed Jul. 17, 2025.

Notice of allowance in U.S. Appl. No. 17/504,299, dated Apr. 15, 2024.

Notice of allowance in U.S. Appl. No. 18/076,146, dated Apr. 15, 2024.

Notice of allowance in U.S. Appl. No. 18/086,103, dated Mar. 25, 2024.

Notice of allowance in U.S. Appl. No. 18/086,103, dated Apr. 3, 2024.

Office Action in U.S. Appl. No. 17/504,260, dated Mar. 21, 2024.

Office Action in U.S. Appl. No. 17/504,299, dated Mar. 22, 2024.

Office Action in U.S. Appl. No. 18/195,152, dated Mar. 26, 2024.

International Search Report and Written Opinion of the International Searching Authority issued in International Application No. PCT/US2023/036567, mailed Mar. 11, 2024 (18 pages).

International Search Report and Written Opinion of the International Searching Authority issued in International Application No. PCT/US2023/081101, mailed Mar. 11, 2024 (19 pages).

Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].

U.S. Appl. No. 17/866,166, filed Jul. 15, 2022 entitled "Game Controller for a Mobile Device with Flat Flex Connector."

U.S. Appl. No. 17/866,234, filed Jul. 15, 2022 entitled "Game Controller for a Mobile Device with Extended Bumper Button."

U.S. Appl. No. 18/076,121, filed Dec. 6, 2022 entitled "Contextually-Aware Platform Service Switcher."

U.S. Appl. No. 18/076,146, filed Dec. 6, 2022 entitled "System and Method for Automatic Content Capability Detection."

(56) References Cited

OTHER PUBLICATIONS

U.S. Appl. No. 18/076,172, filed Dec. 6, 2022 entitled "System and Method for Rich Content Browsing Multitasking on Device Operating Systems with Multitasking Limitations."

U.S. Appl. No. 18/136,509, filed Apr. 19, 2023 entitled "Universal Mobile Game Controller."

U.S. Appl. No. 18/214,917, filed Jun. 27, 2023 entitled "Game Controller with Play-on-Any-Screen Feature."

U.S. Appl. No. 18/214,949, filed Jun. 27, 2023 entitled "Software-Enabled Mobile Game Controller with Integrated Platform Operating Service."

U.S. Appl. No. 18/202,755, filed May 26, 2023 entitled "Cloud Game Queueing."

U.S. Appl. No. 18/226,883, filed Jul. 27, 2023 entitled "Platform-Customized Mobile Game Controller and Methods for Use Therewith."

U.S. Appl. No. 18/226,892, filed Jul. 27, 2023 entitled "Mobile Game Controller and Method for Connecting to a Wireless Audio Device."

"Backbone One"; Mobile gaming hardware product page; Backbone; Dec. 9, 2022; 7 pages.

"Digital Depth: ALL Controller Universal & Fully Customizable"; Kickstarter project page for customizable game controller; Digital Depth Inc.; Aug. 4, 2021; 25 pages.

"PhoneJoy Play: Turn your phone into a console!"; Kickstarter project page for compact gamepad; PhoneJoy Solutions America, Inc.; Jul. 29, 2014; 42 pages.

"Picture-in-picture (PiP) support"; Android Developers UI Guide; downloaded from the Internet on Nov. 27, 2022 at https://developer. android.com/develop/ui/views/picture-in-picture; Nov. 11, 2022; 10 pages.

"AVPictureInPictureController: A controller that responds to user-initiated Picture in Picture playback of video in a floating, resizable window"; Apple Developer Documentation, AVKit; downloaded from the Internet on Nov. 27, 2022 at https://developer.apple.com/ documentation/avkit/avpictureinpicturecontroller; Apple Inc.; 2022; 8 pages.

"GitHub—Kofktu/PIPKit: Picture in Picture for iOS"; downloaded from the Internet on Nov. 27, 2022 at https://github.com/Kofktu/ PIPKit; GitHub, Inc.; 2022; 11 pages.

"Picture-in-Picture API—Web APIs / MDN"; downloaded from the Internet on Nov. 27, 2022 at https://developer.mozilla.org/en-US/ docs/Web/API/Picture-in-Picture_API; Mozilla Corporation; Oct. 10, 2022; 4 pages.

"How to implement Picture in Picture Webview on IOS Swift?"; StackOverflow Questions; downloaded from the Internet on Nov. 28, 2022 at https://stackoverflow.com/questions/69565199/how-to- implement-picture-in-picture-webview-on-ios-swift; StackOverflow; Oct. 14, 2021; 2 pages.

"Displaying live data with Live Activities"; Apple Developer Documentation Activity Kit article; downloaded from the Internet on Nov. 28, 2022 at https://developer.apple.com/documentation/activitykit/ displaying-live-data-with-live-activities; Apple Inc.; 2022; 37 pages.

"User Notifications: Push user-facing notifications to the user's device from a server, or generate them locally from your app"; Apple Developer Documentation; downloaded from the Internet on Nov. 28, 2022 at https://developer.apple.com/documentation/ usernotifications; 2022; 16 pages.

"Gamepass App now supports Picture in Picture"; Reddit, xcloud comments; downloaded from the Internet on Nov. 28, 2022 at https://www.reddit.com/r/xcloud/comments/mvathi/gamepass_app_ now_supports_picture_in_picture/; Reddit Inc.; 2022; 6 pages.

"Pip (picture in picture) mode on android with the xbox game pass beta app"; Reddit, XboxGamePass comments; downloaded from the Internet on Nov. 29, 2022 at https://www.reddit.com/r/XboxGamePass/ comments/n7f5bk/pip_picture_in_picture_mode_on_android_with_ the/; Reddit Inc.; 2022; 6 pages.

"Backbone—Next-Level Play"; Apple App Store preview; downloaded from the Internet on Nov. 29, 2022 at https://apps.apple. com/us/app/backbone-next-level-play/id1449660663; Apple Inc.; 2022; 4 pages.

Max Tech; Backbone One Review—The Best iPhone Gaming Controller!; YouTube product review video; downloaded from the Internet on Nov. 29, 2022 at https://www.youtube.com/watch?v= zRJQjt2nzDo; YouTube; Jun. 2022; 4 pages.

"Game Center"; Apple Developer Game Center overview; downloaded from the Internet on Nov. 29, 2022 at https://developer.apple. com/game-center/; Apple Inc.; 2022; 4 pages.

Tech & Design; "How to Set up New Nintendo Switch | Beginners Guide | First Time Turning on"; YouTube product review video; downloaded from the Internet on Nov. 29, 2022 at https://www. youtube.com/watch!v=XtMcQ9IAkCc; YouTube; 2021; 4 pages.

Box.co.uk; "How Does the Samsung Gaming Hub Work?"; YouTube product tutorial; downloaded from the Internet on Nov. 29, 2022 at https://www.youtube.com/watch?v=uAT4tZR3mNk; YouTube; Oct. 2022; 5 pages.

"Why queue in geforce now so long? I try to answer for this question" Reddit, GeForceNOW comments; downloaded from the Internet on Jun. 7, 2023 at *why queue in geforce now so long? I try to answer for this question* : r/GeForceNOW (reddit.com); Reddit Inc.; Jun. 1, 2023; 6 pages.

Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.

Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone- one-iphone-ios-controller-gaming-portable-review; Vox Media LLC; Apr. 27, 2021; 12 pages.

Faulkner, C.; "Backbone's excellent phone controller is now shipping for Android" The Verge, entertainment tech review webpage; downloaded from the Internet on Nov. 29, 2022 at https://www. theverge.com/2022/11/16/23462127/backbone-one-phone-controller- android-usb-c-features; Vox Media LLC; Nov. 16, 2022; 20 pages.

Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at *Xbox Cloud Gaming 'Lots of people are playing' Fix: Why is queue taking so long?—GameRevolution*; Game Revolution; Dec. 13, 2021; 6 pages.

Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across- all-platforms; Jul. 26, 2021; 14 pages.

Schofield, T.; "Logitech G Cloud Unboxing and Hands on!"; YouTube product review video; downloaded from the Internet on Nov. 29, 2022 at https://www.youtube.com/watch?v=speoPL5vqX0; YouTube; Nov. 2022; 3 pages.

Sholtz, M.; "The Razer Kishi V2 offers a new Virtual Controller mode, and it's pretty slick"; Android Police Newsletter article; downloaded from the Internet on Aug. 16, 2023 at *the Razer Kishi V2 offers a new Virtual Controller mode, and it's pretty slick* (androidpolice.com); Jan. 21, 2023; 7 pages.

Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a- revitalized-game-center-exploring-apples-2020-gaming-updates/; MacStories, Inc.; Aug. 27, 2020; 14 pages.

"Rayz Pro"; Pioneer Rayz™ Pro earbuds product page; downloaded from the Internet on Aug. 16, 2023 at *Rayz Pro Earphone—Pioneer Rayz;* Pioneer Rayz; 2023; 9 pages.

International Search Report and Written Opinion of the International Searching Authority issued in International Application No. PCT/US2021/019941, mailed Jun. 9, 2021 (11 pages).

Notice of allowance in U.S. Appl. No. 17/504,283, dated May 29, 2024.

(56) References Cited

OTHER PUBLICATIONS

Notice of allowance in U.S. Appl. No. 17/504,299, dated Jun. 12, 2024.
Notice of allowance in U.S. Appl. No. 17/856,895, dated Jun. 12, 2024.
Notice of allowance in U.S. Appl. No. 18/076,146, dated Jun. 13, 2024.
Notice of allowance in U.S. Appl. No. 18/086, 103, dated May 28, 2024.
International Search Report and Written Opinion of the International Searching Authority issued in International Application No. PCT/US2023/079521, mailed May 24, 2024 (15 pages).
U.S. Appl. No. 18/734,411, filed Jun. 2024, Maker.
U.S. Appl. No. 18/777,919, filed Jul. 2024, Khaira et al.
U.S. Appl. No. 18/805,902, filed Aug. 2024, Khaira et al.
Notice of allowance in U.S. Appl. No. 17/504,283, dated Sep. 10, 2024.
Notice of allowance in U.S. Appl. No. 17/504,299, dated Sep. 10, 2024.
Notice of allowance in U.S. Appl. No. 17/856,895, dated Aug. 28, 2024.
Notice of allowance in U.S. Appl. No. 18/195,152, dated Aug. 30, 2024.
Notice of allowance in U.S. Appl. No. 18/224,508, dated Aug. 29, 2024.
Office Action in U.S. Appl. No. 18/405,077, dated Sep. 11, 2024.
U.S. Appl. No. 63/770,124, filed Mar. 2025, Khaira.
U.S. Appl. No. 63/781,523, filed Apr. 2025, Khaira.
Office Action in U.S. Appl. No. 18/086,077, dated Mar. 14, 2025.
Office Action in U.S. Appl. No. 18/136,509, dated Apr. 1, 2025.
Jovanee, Alice, The new 8Bitdo Ultimate controller comes in October, https://www.theverge.com/2022/8/30/23326887/8bitdo-ulti mate-pro-control ler-bluetooth-preorder-nintendo-switch-wireless, Aug. 30, 2022 (Year: 2022), 3 pages.
Lon.tv, GameSir X2 USB-C Android Game Controller Review (Newest Version), https://www.youtube.com/watch?v=9Kzytm8D6qk,Nov. 24, 2021 (Year: 2021), 8 pages.
U.S. Appl. No. 18/746,611, filed Jun. 2024, Ivan Torres.
U.S. Appl. No. 18/739,527, filed Jun. 2024, Hong Tai Wei.
Notice of allowance in U.S. Appl. No. 18/076,146, dated Jul. 22, 2024.
Notice of allowance in U.S. Appl. No. 18/086,103, dated Jul. 9, 2024.
Notice of allowance in U.S. Appl. No. 18/195,152, dated Jul. 23, 2024.
Notice of allowance in U.S. Appl. No. 18/224,508, dated Jun. 21, 2024.
U.S. Appl. No. 18/813,384, filed Aug. 2024, Maker.
U.S. Appl. No. 18/915,580, filed Oct. 2024, Khaira et al.
U.S. Appl. No. 18/915,648, filed Oct. 2024, Khaira et al.
U.S. Appl. No. 18/942,103, filed Nov. 2024, Scott et al.
U.S. Appl. No. 18/945,830, filed Nov. 2024, Khaira et al.
U.S. Appl. No. 18/962,755, filed Nov. 2024, Khaira et al.
U.S. Appl. No. 18/967,940, filed Dec. 2024, Khaira et al.
Notice of allowance in U.S. Appl. No. 17/504,260, dated Dec. 9, 2024.
Notice of allowance in U.S. Appl. No. 18/405,077, dated Dec. 12, 2024.
Office Action in U.S. Appl. No. 18/076,172, dated Dec. 2, 2024.
International Search Report and Written Opinion of the International Searching Authority issued in International Application No. PCT/US2024/039193, mailed Nov. 11, 2024 (16 pages).
International Search Report and Written Opinion of the International Searching Authority issued in International Application No. PCT/US2024/039487, mailed Nov. 18, 2024 (20 pages).
International Search Report and Written Opinion of the International Searching Authority issued in International Application No. PCT/US2024/042461, mailed Nov. 12, 2024 (13 pages).

Anonymous: "Chamfer", Wikipedia, Nov. 14, 2022 (Nov. 14, 2022), pp. 1-5, XP093219692, Retrieved from the Internet: URL:https://en.wikipedia.org/w/index.php?title=Chamfer&oldid=1121832130 p. 3, 5 pages.
Anonymous: "Remote Play", Wikipedia, dated Jun. 30, 2023, XP093217737, Retrieved from the Internet: URL:https://en.wikipedia.org/w/index.php?title=Remote_Play&oldid=1162598770, 9 pages.
ROG Tessen Mobile Controller, Transform Your Game, Republic of Gamers, obtained from the Internet on Dec. 16, 2024, URL: https://rog.asus.com/controllers/rog-tessen-mobile-controller/, 7 pages.
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/987,772, filed Nov. 2022, Sorensen.
U.S. Appl. No. 18/086,077, filed Dec. 2022, Maker.
U.S. Appl. No. 18/086,103, filed Dec. 2022, Maker.
U.S. Appl. No. 18/138,377, filed Apr. 2023, Sorensen et al.
U.S. Appl. No. 18/195,152, filed May 2023, Khaira.
U.S. Appl. No. 18/224,508, filed Jul. 2023, Maker.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 18/405,077, filed Jan. 2024, Lake et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated July 27, 2023.
Office Action in CN Application No. 202180019131.2, dated March 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2023/031919, mailed Nov. 17, 2023 (14 pages).
International Search Report and Written Opinion of the International Searching Authority, issued in International Application No. PCT/US2020/061291, mailed Feb. 24, 2021, 20 pages.
Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.
Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.

(56) References Cited

OTHER PUBLICATIONS

Wagner, "Developing Your Own Replay System," Feb. 4, 2004, Retrieved from the Internet: URL: http://www.Jamasutra.com/features/20040204/wagner_01.shtml [retrieved on Oct. 9, 2007], 11 pages.

Office Action in U.S. Appl. No. 17/856,895, dated Mar. 12, 2024.

International Search Report and Written Opinion of the International Searching Authority issued in International Application No. PCT/US2023/036609, mailed Feb. 12, 2024 (15 pages).

International Search Report and Written Opinion of the International Searching Authority issued in International Application No. PCT/US2023/079518, mailed Feb. 9, 2024 (12 pages).

U.S. Appl. No. 19/068,177, filed Mar. 2025, Lake et al.

U.S. Appl. No. 19/096,915, filed Apr. 2025, Maker.

Notice of allowance in U.S. Appl. No. 18/136,509 dated Apr. 24, 2025.

Office Action in U.S. Appl. No. 18/076,121, dated Apr. 16, 2025.

Office Action in U.S. Appl. No. 18/076,172, dated May 12, 2025.

Office Action in U.S. Appl. No. 18/202,755, dated May 7, 2025.

Office Action in U.S. Appl. No. 18/226,883, dated Jun. 6, 2025.

Office Action in U.S. Appl. No. 18/226,892, dated Jun. 2, 2025.

International Preliminary Report on Patentability in International Application No. PCT/US2023/036609, mailed May 15, 2025.

International Preliminary Report on Patentability in International Application No. PCT/US2023/079518 mailed May 22, 2025.

International Preliminary Report on Patentability in International Application No. PCT/US2023/079521 mailed May 22, 2025.

International Search Report and Written Opinion of the International Searching Authority issued in International Application No. PCT/US2024/045554, mailed Dec. 12, 2024.

U.S. Appl. No. 19/013,753, filed Jan. 2025, Khaira.

U.S. Appl. No. 63/743,503, filed Jan. 2025, Khaira.

Notice of allowance in U.S. Appl. No. 18/405,077, dated Dec. 26, 2024.

Notice of allowance in U.S. Appl. No. 18/405,077, dated Jan. 13, 2025.

Notice of allowance in U.S. Appl. No. 18/734,411 dated Jan. 13, 2025.

Office Action in U.S. Appl. No. 18/076,172, dated Jan. 10, 2025.

International Preliminary Reporty on Patentability in International Application No. PCT/US2023/031919, mailed Jan. 16, 2025.

Office Action, Advisory Action, in U.S. Appl. No. 17/504,260, dated Nov. 14, 2024.

Walmart.com; search, obtained from the Internet on Nov. 17, 2024; URL: https://www.walmart.com/search?q=for+Apple+MagSafe+Charger%2C+Wireless+Charger+with+Fast+Charging+Capability%2C+Type+C+Wall+Charger%2C+Compatible+for+iPhone+and+AirPods; 3 pages.

M-Con; obtained from the Internet on Nov. 17, 2024; URL: https://www.m-con.co/; 6 pages.

Office Action in U.S. Appl. No. 17/504,260, dated Jul. 23, 2024.

International Search Report and Written Opinion of the International Searching Authority issued in International Application No. PCT/US2024/019901, mailed Jul. 17, 2024 (15 pages).

Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.

Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.

GameSir G8 Plus Bluetooth Mobile Controller—Big Enough as You Want—GameSir Official Store, obtained from the Internet on Oct. 10, 2024; URL: https://www.gamesir.hk/blogs/news/gamesir-g8-plus-bluetooth-mobile-controller-big-enough-as-you-want, 8 pages.

Kyle Bradshaw, GameSir G8 Galileo Review: The mobile controller I've dreamed of (9to5google.com), obtained from the Internet on Oct. 10, 2024; URL: https://9to5google.com/2024/01/25/review-gamesir-g8-galileo-android-ios/, 12 pages.

Nintendo Switch—Nintendo—Official Site, obtained from the Internet on Oct. 10, 2024; URL: https://www.nintendo.com/us/switch/system/, 17 pages.

Nintendo switch internal—Search Images (bing.com), obtained from the Internet on Oct. 10, 2024; URL: https://www.bing.com/images/search?view=detailV2&ccid=87gF12WI&id=31A64F955C01D87035FBF76FC2B1082808CDF4C2&thid=OIP.87gF12WIjRYTL2hDhEBZtQAAAA&mediaurl=https%3a%2f%2fwww.allaboutcircuits.com%2fuploads%2farticles%2fMouser_IA_Switch_figure5.jpg&cdnurl=https%3a%2f%2fth.bing.com%2fth%2fid%2fR.f3b805d765888d16132f6843844059b5%3frik%3dwvTNCCglscJv9w%26pid%3dImgRaw%26r%3d0&exph=355&expw=474&q=ninetnedo+switch+internal&simid=608038160133663134&FORM=IRPRST&ck=C6F7BED9A8A0BA549A06B2B38B157AFA&selectedIndex=1&itb=0&ajaxhist=0&ajaxserp=0, 4 pages.

Notice of allowance in U.S. Appl. No. 17/856,895, dated Apr. 16, 2024.

Office Action in U.S. Appl. No. 18/405,077, dated May 7, 2024.

International Search Report and Written Opinion of the International Searching Authority issued in International Application No. PCT/US2024/010404, mailed Apr. 24, 2024 (16 pages).

* cited by examiner

FIG. 2

Device Descriptor bLength bDescriptorType bcdUSB bDeviceClass bDeviceSubClass bDeviceProtocol bMaxPacketSize idVendor idProduct bcdDevice iManufaturer iProduct iSerialNumber bNumConfigurations

FIG. 6

Configuration Descriptor bLength bDescriptorType wTotalLength bNuminterfaces bConfigurationValue bmAttributes bMaxPower Interface
Descriptor Endpoint
Descriptor

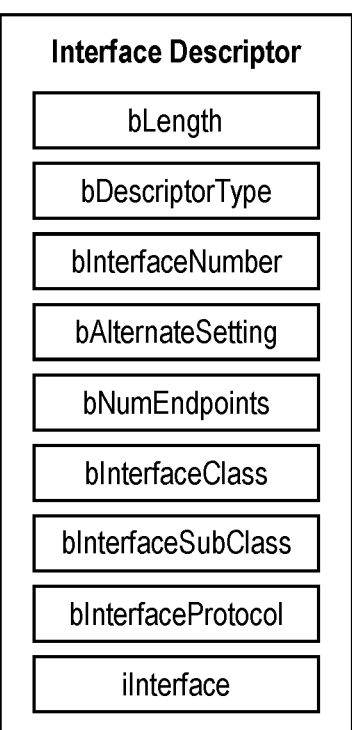

Interface Descriptor bLength bDescriptorType bInterfaceNumber bAlternateSetting bNumEndpoints bInterfaceClass bInterfaceSubClass bInterfaceProtocol iInterface

FIG. 8

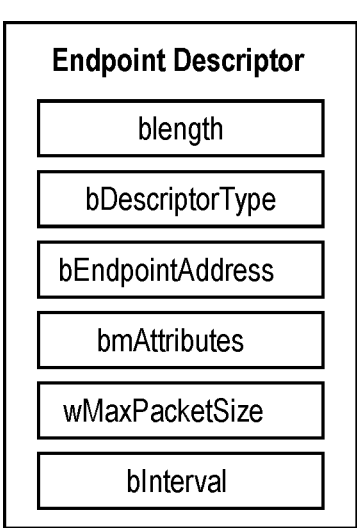

Endpoint Descriptor blength bDescriptorType bEndpointAddress bmAttributes wMaxPacketSize bInterval

FIG. 9

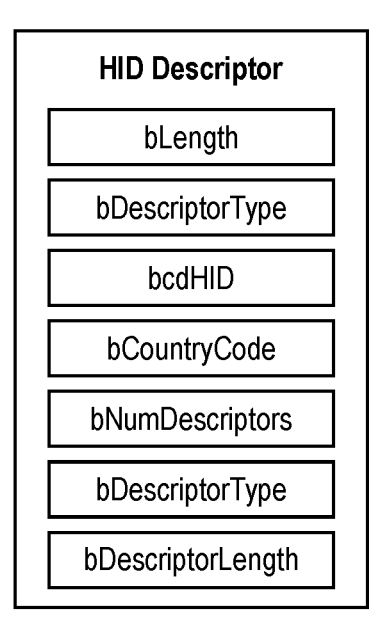

HID Descriptor bLength bDescriptorType bcdHID bCountryCode bNumDescriptors bDescriptorType bDescriptorLength

FIG. 10

```
UsagePage(GenericDesktop)
Usage(GenericDesktop,Gamepad)
Collection(Application)
        Usage(GenericDesktop,Gamepad)
        Collection(Logical)
                Logical(-127, 127)
                Physical(-127, 127)
                Usage(GenericDesktop, Pointer)
                Collection(Physical)
                        ReportSize(8)
                        ReportCount(4)
                        Usage(GenericDesktop, X)
                        Usage(GenericDesktop, Y)
                        Usage(GenericDesktop, Z)
                        Usage(GenericDesktop, Rz)
                        Input(data,var, abs)
                EndCollection ReportCount(2)
                Logical(0, 255)
                Physical(0, 255)
                UsagePage(Button)
                Usage(Button, Button7)
                Usage(Button, Button8)
                Input(data,var, abs)

...
        EndCollection
EndCollection
```

FIG. 11

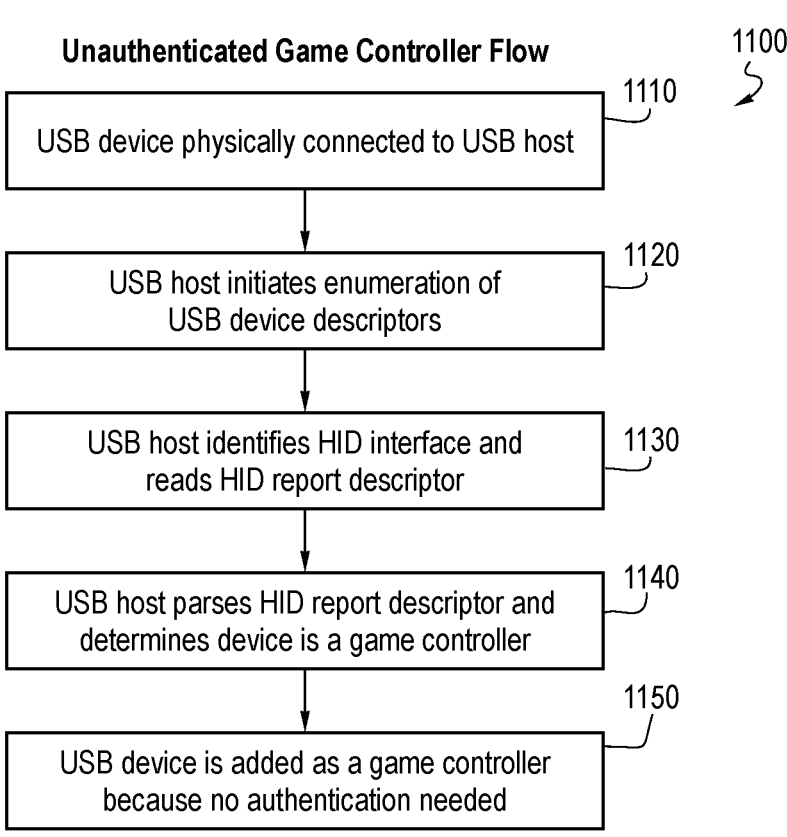

Unauthenticated Game Controller Flow

1100

1110

USB device physically connected to USB host

1120

USB host initiates enumeration of
USB device descriptors

1130

USB host identifies HID interface and
reads HID report descriptor

1140

USB host parses HID report descriptor and
determines device is a game controller

1150

USB device is added as a game controller
because no authentication needed

FIG. 12

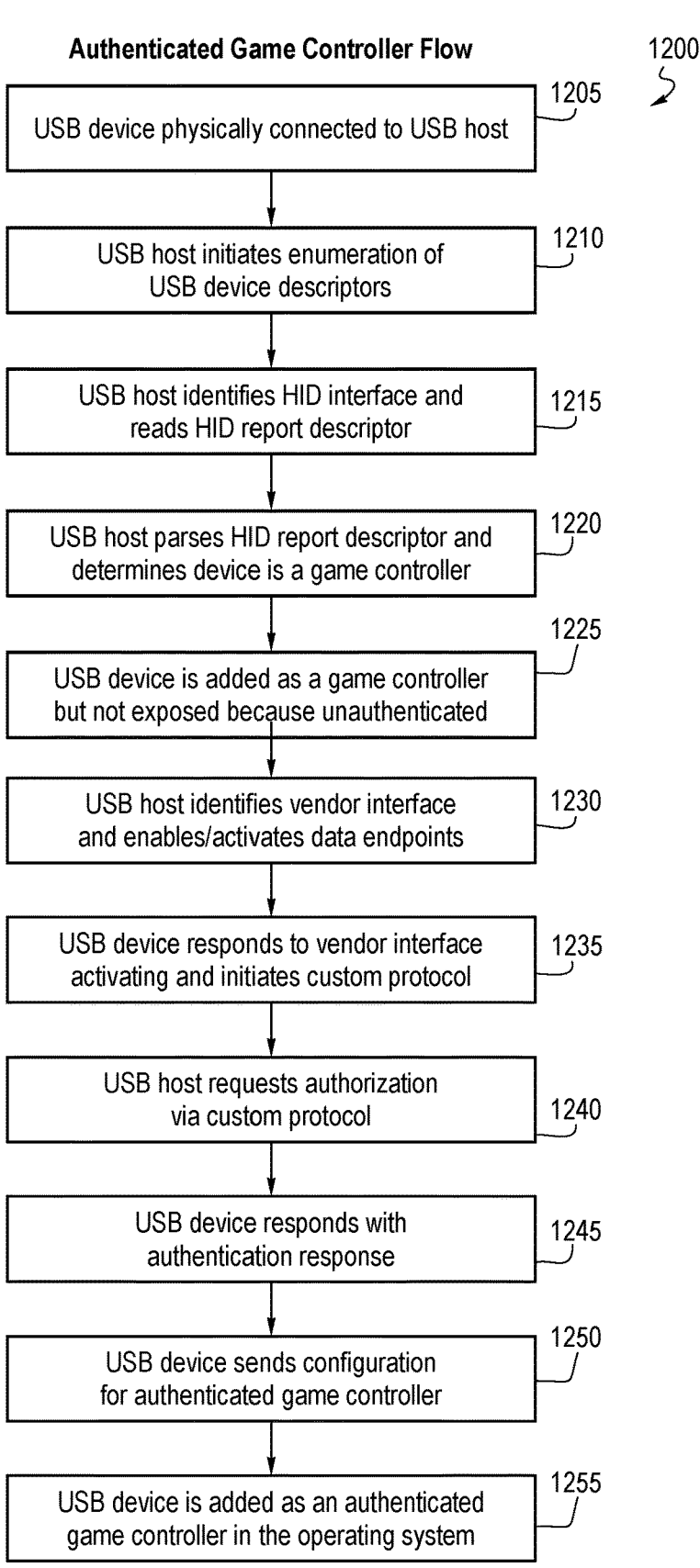

Authenticated Game Controller Flow

1200

USB device physically connected to USB host — 1205

↓

USB host initiates enumeration of
USB device descriptors — 1210

↓

USB host identifies HID interface and
reads HID report descriptor — 1215

↓

USB host parses HID report descriptor and
determines device is a game controller — 1220

↓

USB device is added as a game controller
but not exposed because unauthenticated — 1225

↓

USB host identifies vendor interface
and enables/activates data endpoints — 1230

↓

USB device responds to vendor interface
activating and initiates custom protocol — 1235

↓

USB host requests authorization
via custom protocol — 1240

↓

USB device responds with
authentication response — 1245

↓

USB device sends configuration
for authenticated game controller — 1250

↓

USB device is added as an authenticated
game controller in the operating system — 1255

Primary System Architecture

Secondary System Architecture

Combined System Architecture

1700

| | |
|---|---|
| Processor | 1710 |
| Memory | 1720 |
| Primary Transceiver | 1730 |
| Game Controller Interface | 1740 |
| Measuerment Sequencer | 1742 |
| HID gamepad | 1744 |
| Gamepad Profile Manager | 1746 |
| Configurable Secondary Port | 1750 |
| Secondary Transceiver | 1752 |
| Charger Subsystem | 1754 |
| App Interaction Model | 1760 |
| Controller Analytics | 1770 |
| Boot/upgrade Support | 1780 |

Android Enumeration Sequence

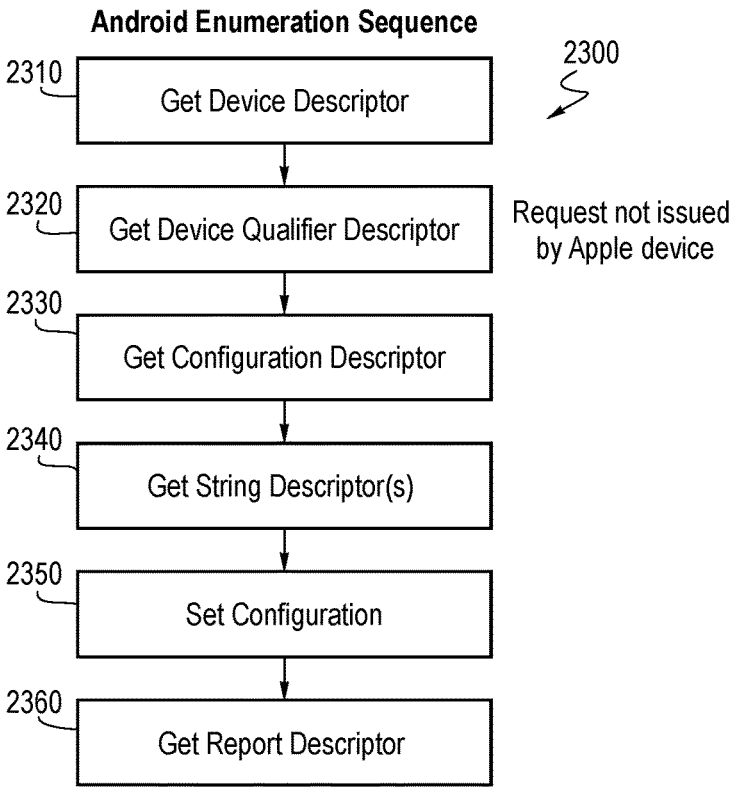

2310   Get Device Descriptor

2300

2320   Get Device Qualifier Descriptor     Request not issued by Apple device

2330   Get Configuration Descriptor

2340   Get String Descriptor(s)

2350   Set Configuration

2360   Get Report Descriptor

FIG. 24 iOS Enumeration Sequence

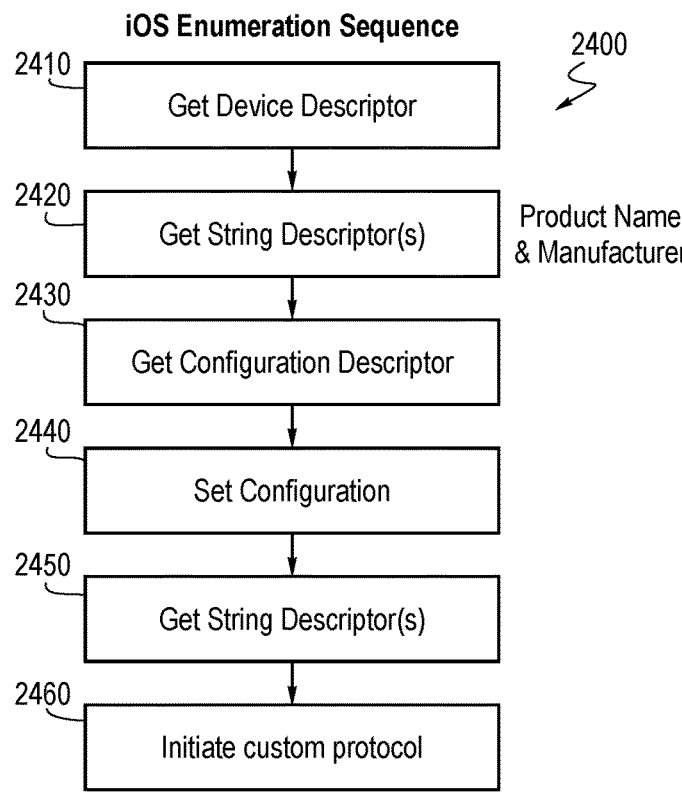

2400

2410   Get Device Descriptor

2420   Get String Descriptor(s)     Product Name & Manufacturer

2430   Get Configuration Descriptor

2440   Set Configuration

2450   Get String Descriptor(s)

2460   Initiate custom protocol

FIG. 25

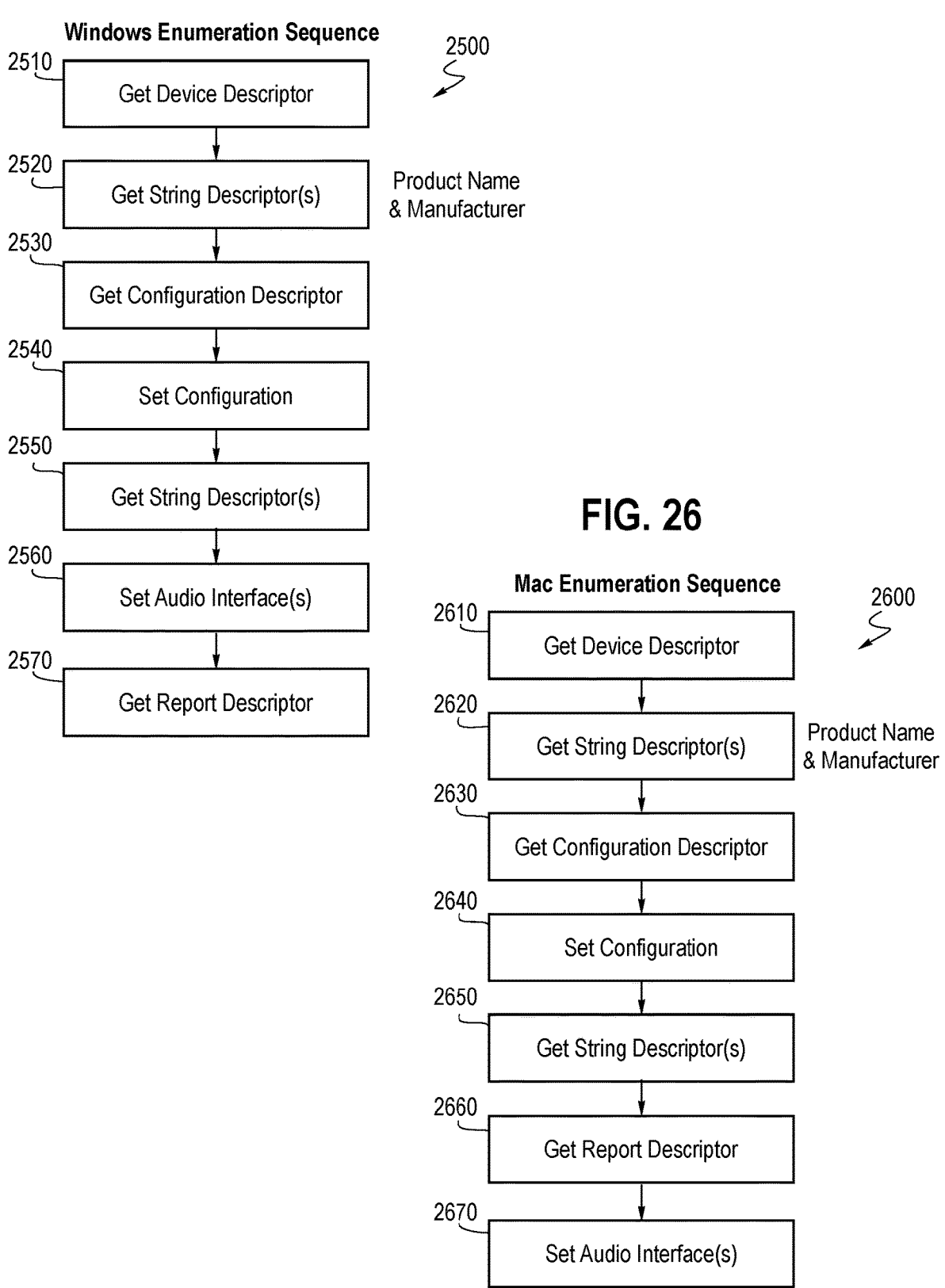

Windows Enumeration Sequence    2500

2510    Get Device Descriptor

2520    Get String Descriptor(s)    Product Name & Manufacturer

2530    Get Configuration Descriptor

2540    Set Configuration

2550    Get String Descriptor(s)

2560    Set Audio Interface(s)

2570    Get Report Descriptor

FIG. 26

Mac Enumeration Sequence    2600

2610    Get Device Descriptor

2620    Get String Descriptor(s)    Product Name & Manufacturer

2630    Get Configuration Descriptor

2640    Set Configuration

2650    Get String Descriptor(s)

2660    Get Report Descriptor

2670    Set Audio Interface(s)

Primary Port
(Form Fitting Plug)

2710 —

Universal Profile

2712

Secondary Port
(Charging & Data)    2720

Universal Profile (Default) — 2722

Mac Profile — 2724

Windows Profile — 2726

Programmable Profile — 2728

Configurable Profile Data
(Packed as byte stream)    2800

Base Profile Index — 2802

Profile Attributes — 2804

HID report descriptor — 2806

HID usage map — 2808

Hybrid HID Game Controller Flow

UNIVERSAL MOBILE GAME CONTROLLER

CROSS-REFERENCE TO RELATED APPLICATION

This application claims the benefit of U.S. Provisional Patent Application No. 63/435,089, filed Dec. 23, 2022, and U.S. Provisional Patent Application No. 63/524,014, filed Jun. 29, 2023, both of which are hereby incorporated by reference.

BACKGROUND

A controller can be used with a computing device to select and/or interact with content using user input devices on the controller. The content can be locally-stored on the computing device and/or streamed from a remote device. For example, the controller can be a game controller used to play a game that is native to the computing device and/or to play a game that is streamed from a remote server to a browser of the computing device.

BRIEF DESCRIPTION OF THE DRAWINGS

FIG. 2 is an illustration of a controller and computing device of an embodiment.

FIG. 6 is an illustration of a configuration descriptor of an embodiment.

FIG. 7 is an illustration of an interface descriptor of an embodiment.

FIG. 8 is an illustration of an endpoint descriptor of an embodiment.

FIG. 9 is an illustration of a human interface device (HID) descriptor of an embodiment.

FIG. 10 is an illustration of an HID report descriptor of an embodiment.

FIG. 11 is a flow chart of an unauthenticated game controller flow of an embodiment.

FIG. 12 is a flow chart of an authenticated game controller flow of an embodiment.

FIG. 19 is an illustration of an accessory-app architecture of an embodiment.

FIG. 23 is an illustration of an Android enumeration sequence of an embodiment.

FIG. 24 is an illustration of an iOS enumeration sequence of an embodiment.

FIG. 25 is an illustration of a Windows enumeration sequence of an embodiment.

FIG. 26 is an illustration of a Mac enumeration sequence of an embodiment.

DETAILED DESCRIPTION

Introduction

The following embodiments describe a system architecture and implementation that allow a controller (in one implementation, a mobile game controller) to interoperate with multiple computing device operating systems (e.g., Android and iOS, although other operating systems can be used) in an automatic way through a common connector (e.g., USB-C, although other common connectors can be used). In addition, these embodiments can enable communication to an application running within the computing device operating system. Without these embodiments, it might be necessary to have a separate embedded system to support each of the major computing device operating systems. Typically, this is done through unique product SKUs that are specifically designed for each ecosystem. Even if a single hardware solution were developed, there would still be a significant product usability issue; without a way to automatically detect what kind of computing device was attached, the product would require manual user intervention to configure the game controller. With these embodiments, a fully automatic USB-C game controller that supports Android and iOS (examples of computing device operating systems, but others can be used) can be provided. That is, instead of building separate products for iOS and Android, for example, with these embodiments, a single version can support both, which is more efficient in various facets of product development and is more intuitive to customers because there is no ambiguity in identifying which version is needed.

Before turning to a description of example implementations of a universal game controller, the following section provides an overview of an exemplary computing environment. It should be understood that these are merely examples and other implementations can be used. Accordingly, none of the details presented herein should be read into the claims unless expressly recited therein.

Overview of an Exemplary Computing Environment

Figure 1:
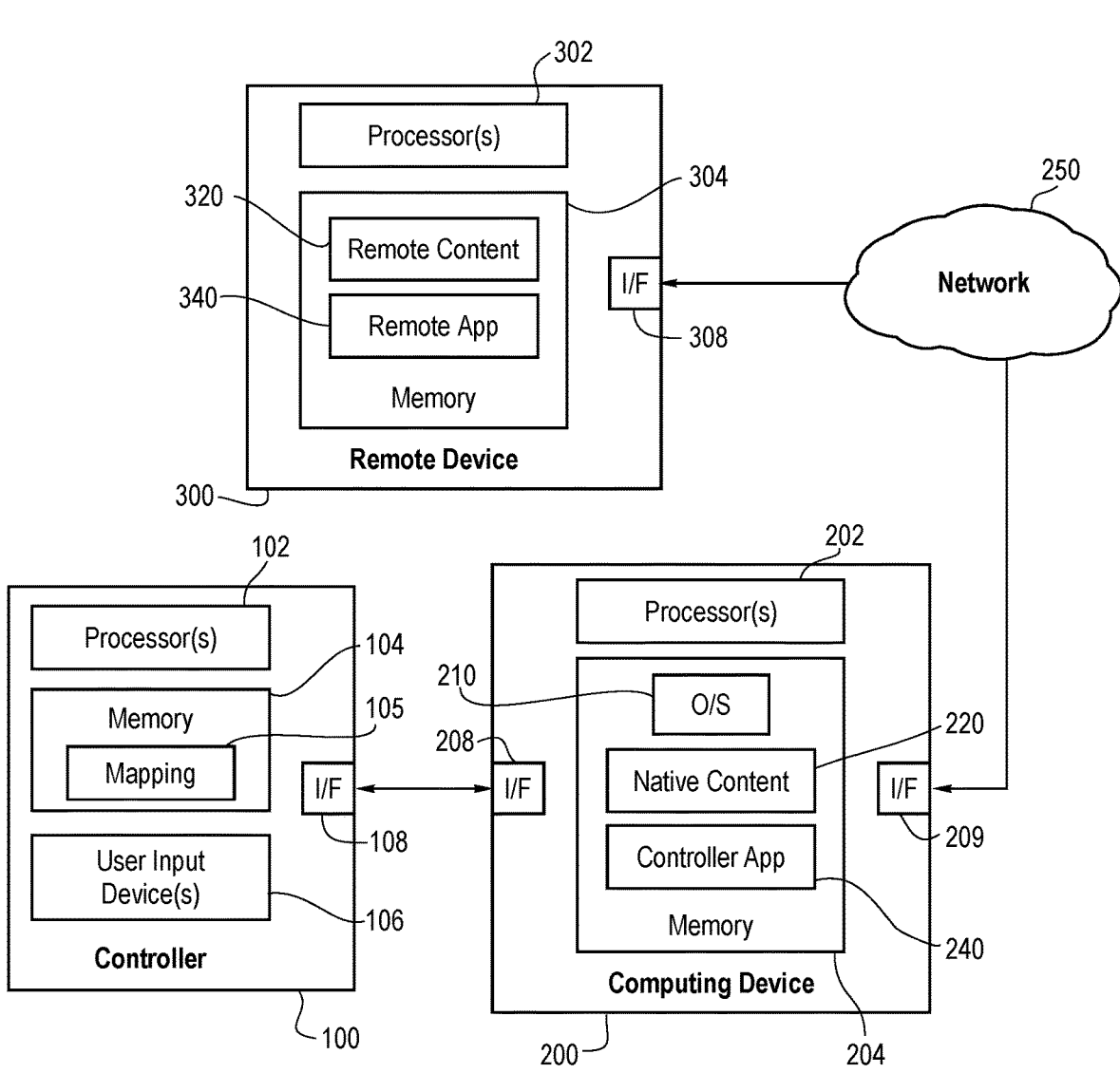
FIG. 1 is a block diagram of a computing environment of an embodiment.

Turning now to the drawings, FIG. 1 is an illustration of a computing environment of an embodiment. As shown in FIG. 1, this environment comprises a user controller 100, a computing device 200, and a remote device 300. The user controller 100 and computing device 200 are in communication with each other via respective wired or wireless interfaces 108, 208. Likewise, the computing device 200 and the remote device 300 are in communication with each other via wired or wireless interfaces 209, 308. As used herein, "in communication with" can mean in direct communication with or in indirect communication with via one or more components, which may or may not be mentioned herein. For example, in the embodiment shown in FIG. 1, the computing device 200 and the remote device 300 are in communication with each other via a network 250 (e.g., the Internet, a local area network, a peer-to-peer wireless mesh, etc.). However, in other embodiments, the computing device 200 and the remote device 300 can communicate with each other in the absence of a network. Also, as used herein, the remote device 300 is "remote" in the sense that it is physically separate from the computing device 200 in some fashion. In many implementations, the physical distance is relatively great, such as when the remote device 300 is located in another town, state, or country. In other implementations, the physical distance may be relatively short, such as when the remote device 300 is in the same room or building as the computing device 200. Also, the term "remote device" can refer to a single remote device or multiple remote devices.

As shown in FIG. 1, in this embodiment, the controller 100 comprises one or more processors 102, a memory 104, and one or more user input devices 106. The user input devices 106 can take any suitable form, such as, but not limited to, a button, a joystick, a switch, a knob, a touch-sensitive screen/pad, a microphone for audio input (e.g., to capture a voice command or sound), a camera for video input (e.g., to capture a hand or facial gesture), etc. To be clear, as used herein a "user input device" refers to a control surface and not to the entire system or parent device on which user input devices are placed.

Generally speaking, the controller 100 can be used by a user in the selection and (passive or active) consumption of content (e.g., playing a game, watching a video, listing to audio, reading text, navigating a displayed user interface, etc.) presented using the computing device 200 in some fashion. The controller 100 may be referred to based on the content with which it is being used. For example, the controller 100 can be referred to as a game controller when it is being used to play a game. And if the controller 100 is being used to play a game on a mobile device, such as a phone or tablet (as opposed to a relatively-stationary game console), the controller 100 can be referred to as a mobile game controller. However, the same controller 100 may also be used to control the playback of non-game content, such as video or audio. Accordingly, a specific use should not be read into the term "controller" unless expressly stated.

The computing device 200 can also take any suitable form, such as, but not limited to, a mobile device (e.g., a phone, tablet, laptop, watch, eyewear, headset, etc.) or a relatively more-stationary device (e.g., a desktop computer, a set-top box, a gaming console, etc.). In the embodiment shown in FIG. 1, the computing device 200 comprises one or more processors 202 and a memory 204. In this particular embodiment, the memory 204 stores computer-readable program code for an operating system (O/S) 210 (e.g., iOS or Android), native content 220, and an application configured for use with the controller 100 ("controller app") 240. This application 240 will sometimes be referred to herein as the client platform operating service or system. Exemplary functions of this application 240 will be described herein. Also, as used herein, "native content" refers to content that is at least partially stored in the computing device 200. For example, native content can be wholly stored on the computing device; or native content can be stored partially on the computing device 20 and partially on one or more remote devices 300 or some other device or set of devices.

The remote device 300 also comprises one or more processors 302 and memory units 304 storing remote content 320 and an application ("app") 340 (which is sometimes referred to herein as the remote platform operating service or system) that can be used to communicate with the controller app 240 or another entity on the computing device 200.

It should be understood that more or fewer components than what are shown in FIG. 1 can be used. For example, the computing device 200 can have one or more user input device(s) (e.g., a touchscreen, buttons, switches, etc.), as well as a display (e.g., integrated with a touchscreen). Further, while the components in the controller 100, computing device 200, and remote device 300 are all shown in respective single boxes in FIG. 1, implying integration in respective single devices, it should be understood that the components can be located in multiple devices. For example, the processor 302 and memory 304 in the remote device 300 can be distributed over multiple devices, such as when the processor 302 is a server and the memory 304 is a remote storage unit. As used, the remote device 300 can also refer to multiple remote devices that are in communication with the computing device 200. Other variations for any of the devices 100, 200, 300 are possible.

Finally, the memory 104, 204, 304 in these various devices 100, 200, 300 can take any suitable form and will sometimes be referred to herein as a non-transitory computer-readable storage medium. The memory can store computer-readable program code having instructions that, when executed by one or more processors, cause the one or more processors to perform certain functions.

Figure 2:
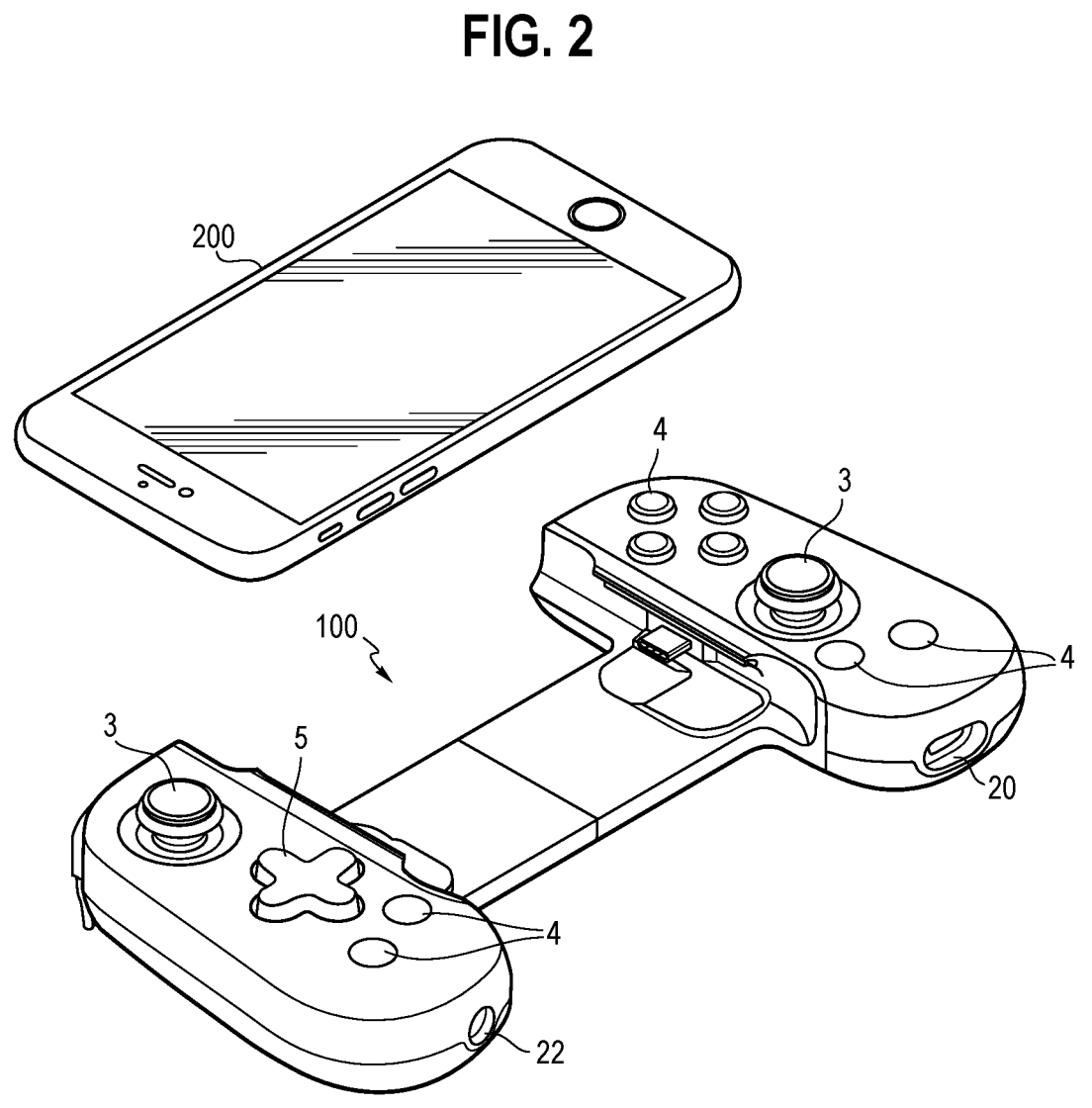
Figure 3:
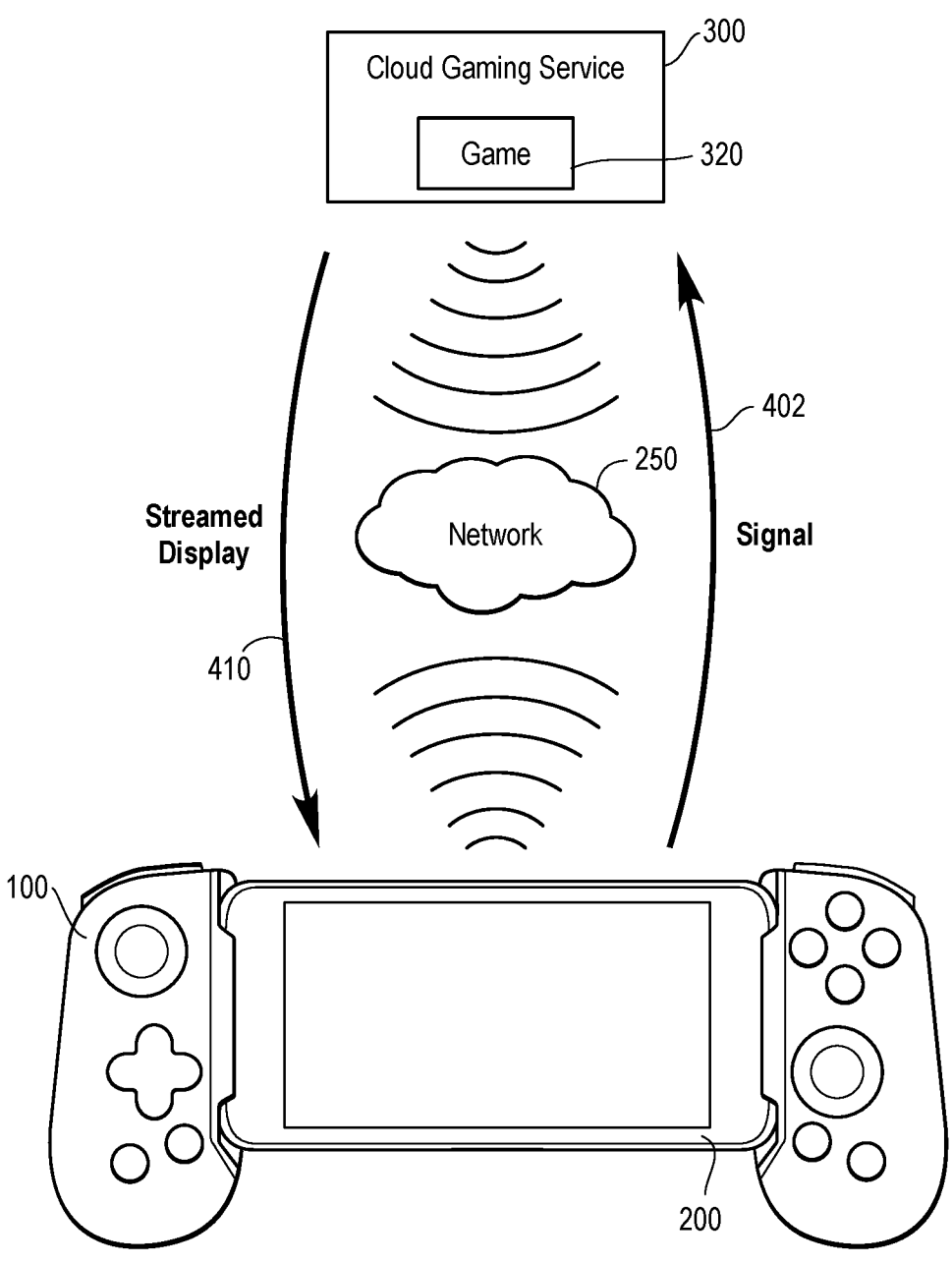
FIG. 3 is a block diagram of a computing environment of an embodiment.

As mentioned above, the controller 100, computing device 200, and remote device 300 can take any suitable form. For purposes of describing one particular implementation of an embodiment, the controller 100 in this example takes the form of a handheld game controller, the computing device 200 takes the form of a mobile phone or tablet, and the remote device 300 takes the form of a cloud gaming system. This example is shown in FIGS. 2 and 3. Again, this is just one example, and other implementations can be used. Further, as mentioned above, a game is just one example of content that can be consumed, and the controller 100 can be used with other types of content (e.g., video, audio, text). So, the details presented herein should not be read into the claims unless expressly recited therein.

Turning first to FIG. 2, FIG. 2 shows an example handheld game controller 100 and mobile phone 200 of an embodiment. This game controller 100 has a number of user input devices, such as joysticks 3, buttons 4, and toggle switches 5. In this example, the game controller 100 takes the form of a retractable device, which, when in an extended position, is able to accept the mobile phone 200. A male communication plug on the controller 100 mates with a female communication port on the computing device 200 to place the controller 100 and computing device 200 in communication with one another. The controller 100 in this embodiment also has a pass-through charging port 20 that allows the computing device 200 to have its battery charged and a head-phone jack 22. In other embodiments, the controller 100 can connect to the computing device 200 through other means such as pairing wirelessly to the phone 200. Again, this is just an example, and other types of controllers can be used, such as those that do not fit around a mobile device.

As shown in FIG. 3, in this embodiment, the controller 100 can be used to play a game that is locally stored on the computing device 200 (a "native game" 220) or a game 320 that is playable via a network 250 on a cloud gaming service 300. In this example embodiment, remote gameplay, based on input from the game controller 100, the computing device 200 sends signals 402 to the cloud gaming service 300 and receives display data 410 back. In one embodiment, a browser on the computing device 200 is used to send and receive the signals 402, 410 to stream the game 320 to the user. There can be multiple variants of remote game play. One embodiment includes a host device, such a game console, PC, or other computing device not actively being controlled that can be streamed to the active computing device, such as a smartphone. from a host device (e.g., game console or PC) that a user can access remotely via their smartphone) and Another embodiment includes a cloud gaming service (which can be streamed from a data center), such as Xbox Game Pass, Amazon Luna, or other service, that can be streamed to the active computing device.

In one embodiment, the controller app 240 can facilitate the selection of a game (or other content). For example, the controller app 240 can display a user interface (e.g., on a display of the computing device 200 or on another display). The controller app 240 can also receive user input from the controller 100 to navigate and engage with content, for example, browse for, select, and launch a game from a displayed list of games. In this example, once the game is launched, input from the game controller 100 can be provided directly to the game or indirectly to the game through the controller app 240. As will be discussed in more detail below, the controller app 240 can enhance the standard experience offered on a computing device by extending functionality and providing enhanced interface capabilities in addition to the inherent interface of the computing device itself. For example, in some embodiments, the controller app 240 assigns a function to one or more of the user input devices on the controller 100 based on the particular content being consumed.

Example Implementations of a Universal Game Controller

Hardware

In one embodiment, the system comprises a USB host and a USB device. The USB host is typically a computing device of some kind, such as a mobile phone, tablet, or PC. The USB device in this case refers to a controller (in one embodiment, a mobile game controller). USB hosts have a downstream connection to the device and the USB device has an upstream connection to the host.

In one embodiment, the USB device supports at a minimum USB 1.1 full speed transmission characteristics. Due to the backwards compatible nature of newer USB versions, a USB 2.0 connection or even a 3.x connection is capable of enabling the type of USB communication can be used.

Communication

The USB communication protocol of an embodiment is summarized below. Each USB transmission can be described by a series of packets, where there is first a token packet, followed by an optional data packet, and completed with a status packet. The communication is driven by the USB host, and certain packet stages allow for data to flow upstream, such as when the host wants to read data from the device.

Packet Fields

In one embodiment, every USB packet consists of the following fields:

Sync (For receiver clock synchronization)
PID (Packet ID, used to identify packet type)

6

EOP (End of Packet)
With conditional fields depending on the packet type:
ADDR (Device Address)
ENDP (Endpoint Number)
CRC (Cyclic Redundancy Check)
Data
Frame Number Packet Types Token Packet: Either IN, OUT, or SETUP packet which informs the USB device of the type of exchange that the host wants.

| Sync | PID | ADDR | ENDP | CRC | EOP |
|------|-----|------|------|-----|-----|

Data Packet: One of four data transmission types: DATA0, DATA1, DATA2, MDATA

| Sync | PID | Data | CRC | EOP |
|------|-----|------|-----|-----|

Handshake Packet
One of three packet IDs: ACK, NAK, STALL

| Sync | PID | EOP |
|------|-----|-----|

Start of Frame Packet

| Sync | PID | Frame Number | CRC | EOP |
|------|-----|--------------|-----|-----|

Endpoints

USB endpoints are used in the USB protocol to differentiate different sources of data exchanged on the bus and are essentially the point where the low-level protocol ends and the high-level USB functions begin. Endpoints are given a number 0-15, with zero being a required (implied) control endpoint for the protocol. At the device level, an endpoint is a chunk or allocation of USB buffer memory where the data is read or written to by USB transmissions.

When the host communicates with a device at the functional level, it is communicating through an endpoint. Endpoints can be further grouped into logical interfaces, which provide a greater level of abstraction to describe their function.

The control endpoint is used in conjunction with standardized requests to exchange information about the USB device, which ultimately informs the host about the remaining endpoints and their intended function. The description of the USB device is organized into objects referred to as descriptors, which exist as a hierarchy. In addition, endpoints can be one of four types which define their transfer characteristics:

Control (Command and status operations)
Isochronous (Continuous periodic transfers)
Bulk (Large burst transfers)
Interrupt (Small device initiated transfers)

Descriptors

In USB, the USB device provides several descriptors to the host which encode various characteristics of the device. These descriptors are organized into a hierarchy, with the device descriptor at the top, followed by one or more configuration descriptors, and each configuration descriptor containing one or more interface descriptors. Interfaces can include zero or more endpoint descriptors, with the zero case being typically used to describe an idle interface (where certain endpoints can be deactivated).

Figure 4:
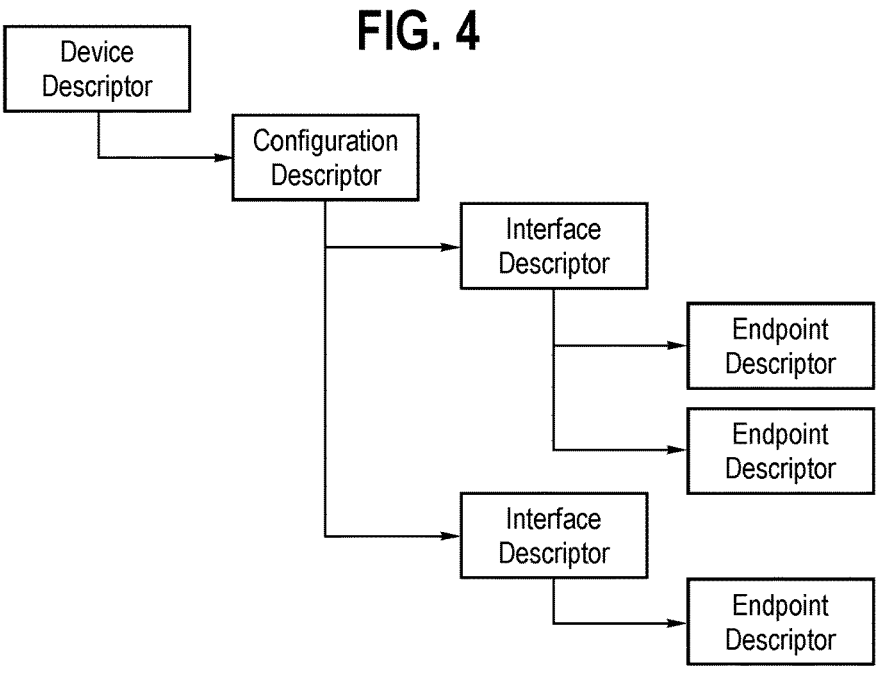
FIG. 4 is an illustration of a descriptor layout of an embodiment.

FIG. 4 is a descriptor layout of an embodiment.

Device Descriptor

The device descriptor contains the basic information about the USB device. In addition to containing various device identifiers, it defines key characteristic information that determines the USB version, control max packet size, and class of device which is required to continue further communication on the control endpoint. One other key field on the device descriptor is the number of configurations, which informs the host how many configuration descriptors follow (most devices use just one).

Figure 5:
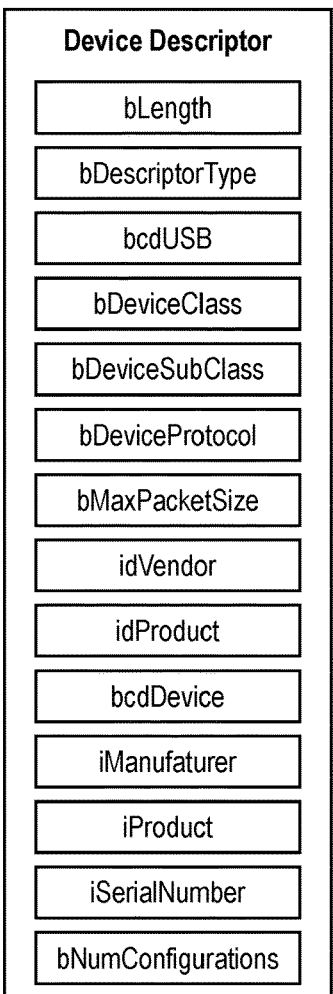
FIG. 5 is an illustration of a device descriptor of an embodiment.

FIG. 5 is a device descriptor layout of an embodiment.

Configuration Descriptor

The configuration descriptor contains all of the remaining information about the USB device and its interfaces and endpoints. In the header of the descriptor, the number of interfaces are specified, which informs the host of how many interfaces follow. The configuration descriptor also defines power related attributes, and a USB host may interrogate multiple configurations before deciding which to use (usually using power attributes as the criteria).

FIG. 6 is a configuration descriptor layout of an embodiment.

Interface Descriptor

The interface descriptor is essentially a grouping of endpoints that relate to the same function or feature. In addition to the number of endpoint descriptors to follow, the interface descriptor defines the interface class, subclass, and protocol which further inform the host of the interface's function.

Typical interface classes: HID, Audio, Vendor

FIG. 7 is an interface descriptor layout of an embodiment.

Endpoint Descriptor

The endpoint descriptor associates the transfer attributes (direction, type, packet size, interval) for an endpoint number. The host uses this information for determining bandwidth requirements on the bus.

FIG. 8 is an endpoint descriptor layout of an embodiment.

String Descriptor

Each string on the device is stored in its own descriptor, and referenced in various other descriptors via an index. Generally, the strings do not change the function of the device and are primarily used for display purposes.

HID Descriptor

When implementing a human interface device (HID), this descriptor informs the host of which HID version is being used and how many associated descriptors are present. For example, if the descriptor type is specified as "report", the descriptor count is the number of HID report descriptors implemented.

FIG. 9 is an HID descriptor layout of an embodiment.

HID Report Descriptor

A special descriptor used with the HID interface class/descriptor to encode the HID device and its report details. In this context, a report is essentially a packet of bytes that are exchanged with the host, usually via an interrupt endpoint. The HID descriptor can potentially reference multiple report descriptors, but it is up to the host to decide how to handle multiple HID devices.

FIG. 10 is an HID report descriptor layout of an embodiment.

USB Requests

Standard Requests

The eight standard USB requests begin with a setup packet (token packet with the PID of setup), and are followed by a data packet in situations where data is returned, such as on a get operation.

Get Status
Clear Feature
Set Feature
Set Address
Get Descriptor
Set Descriptor
Get Configuration
Set Configuration In addition, there are a few standard interface requests which are requests that reference specific USB interfaces from the USB descriptor:

Get Status
Clear Feature
Set Feature
Get Interface
Set Interface

USB Enumeration

At a high level, all USB hosts follow a similar sequence to identify a USB device through control transfers, at least at first. The sequence of requests to read out the descriptors of a USB device is often referred to as the USB device enumeration.

A typical enumeration flow can be summarized as follows:

1. Set Address
2. Get Device Descriptor
3. Get Configuration Descriptor
4. (Optional) Get String Descriptors
5. SetConfiguration
6. (Optional) Get HID Report Descriptors
7. SetInterface Once the address is set, the first part of the USB enumeration process is to get the device descriptor. The host will then use the bNumConfigurations field to determine how many configuration descriptors to read. Upon reading the configuration descriptor, the host will decide whether the configuration is supported and allocate resources for the supported interfaces. Next, the host will usually read out the various product strings as this typically needs to be displayed to the user. Assuming the configuration is deemed acceptable, the host will issue a SetConfiguration call to inform the device which configuration it would like to use. Finally, the host does another pass of reading secondary descriptors such as HID report descriptors, strings, and finally sets idle or active interfaces.

Unauthenticated Game Controller

For USB hosts, such as those running Android OS, that do not implement custom protocols such as authentication, the game controller device can configure a subset of its USB descriptors in a standard way such that the USB host can easily identify the game controller without custom protocols. Usually, this can be achieved by simply making the standard configuration appear first, as most hosts just pick the first interface it encounters. For example, if the standard HID interface that describes the HID game controller appears first, the unauthenticated device procedure will select that first interface, ignoring any subsequent HID interfaces that appear later in the USB configuration. Although additional HID interfaces are ignored by the operating system, these interfaces could still be used by a mobile application, for example to support additional custom buttons.

Standard USB host behavior does not necessarily mean it cannot support custom protocols. Outside of the HID game controller, a USB host can also provide an API to interact with vendor interfaces. For example, an application running on a USB host can use an API to establish bulk data communication with the mobile game controller via connecting to a vendor interface. Using the API, the application can select the appropriate vendor interface (by filtering the protocol identifier), while ignoring any other vendor interfaces that are not intended for use on this platform. One example of a vendor interface could include two bulk endpoints for IN and OUT communication which would be the primary data pipe for the app and game controller to exchange vendor messages. Another example would be an interrupt endpoint declared in a vendor interface, used to transmit asynchronous messages to the app such as custom button presses.

FIG. 11 is a flow chart 1100 of an unauthenticated game controller flow of an embodiment. As shown in FIG. 11, the USB device is physically connected to the USB host (act 1110). Then, the USB host initiates enumeration of USB device descriptors (act 1120). Next, the USB host identifies the HID interface and reads the HID report descriptor (act 1130). The USB host then parses the HID report descriptor and determines that the device is a game controller (act 1140). Finally, the USB device is added as a game controller because no authentication is needed (act 1150).

Authenticated Game Controller

For USB hosts that support a custom protocol for identification or authentication of accessory devices, such as hosts that run iOS, specific vendor interfaces can be used to implement the protocol. In certain embodiments, the USB host checks each vendor interface on the USB device, looking for a specific protocol identifier. When found, the host can inspect the associated endpoints, looking for a compatible combination, for example the existence of a pair bulk data endpoints (IN and OUT) which would be required for bi-directional communication. Bulk endpoints are commonly used due to their flexibility in packet sizes and bandwidth efficiency. If the host is satisfied with the USB configuration, it can enable the interface which in turn lets the device (mobile game controller) initiate communication for the custom protocol.

As part of the custom protocol, the mobile game controller will identify itself as a HID device and provide the specific HID report descriptors to the host. In some embodiments, the HID report descriptor is communicated directly through the protocol, and any subsequent HID input reports are transmitted via said protocol.

However, in other embodiments, the HID report descriptor is referenced from the standard USB device configuration. In this case, the device communicates the interface number in the device configuration in which to locate the HID descriptor, via the custom protocol. The USB host then knows which HID interface to use. In the context of universality, the custom HID interface should not be the first to appear in the configuration, such that standard host setups can be simultaneously allowed.

FIG. 12 is a flow chart of an authenticated game controller flow of an embodiment. As shown in FIG. 12, the USB device is physically connected to the USB host (act 1205). Then, the USB host initiates enumeration of USB device descriptors (act 1210). Next, the USB host identifies the HID interface and reads the HID report descriptor (act 1215). The USB host then parses the HID report descriptor and determines that the device is a game controller (act 1220). The USB device is added as a game controller but not exposed because the USB device is unauthenticated (act 1225). Next, the USB host identifies the vendor interface and enables/activates data endpoints (act 1230). The USB device responds to the vendor interface activating and initiates a custom protocol (act 1235). The USB host requests authorization via the custom protocol (act 1240), and the USB device responds with an authentication response (act 1245). The USB device also sends a configuration for an authenticated game controller (act 1250). Finally, the USB device is added as an authenticated game controller in the operating system (act 1255).

System Overview

In this disclosure, the system comprises a USB-C equipped game controller and a USB-C equipped computing device, typically a smartphone or other mobile device (though not necessarily limited to the type of computing device, and it should be understood that USB-C provides an example physical configuration of a connector between the two devices). In the example, the two devices communicate via USB, and the primary solution is the architecture and behavior of the game controller side of the system.

Figure 13:
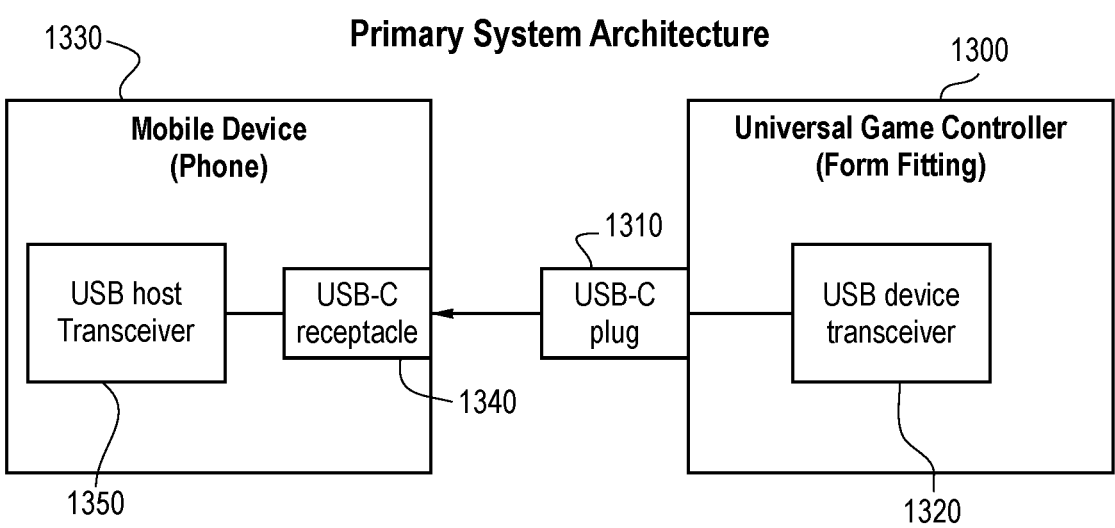
FIG. 13 is an illustration of a primary system architecture of an embodiment.

In the primary use case, the game controller is shown below connecting to a mobile phone. FIG. 13 is an illustration of a primary system architecture of an embodiment. As shown in FIG. 13, in this architecture, a universal game controller 1300 is connected, via a USB-C plug 1310, with a mobile device 1330. The universal game controller 1300 comprises a USB device transceiver 1320, and the mobile device 1330 comprises a USB-C receptacle 1340 and a USB host transceiver 1350.

Figure 14:
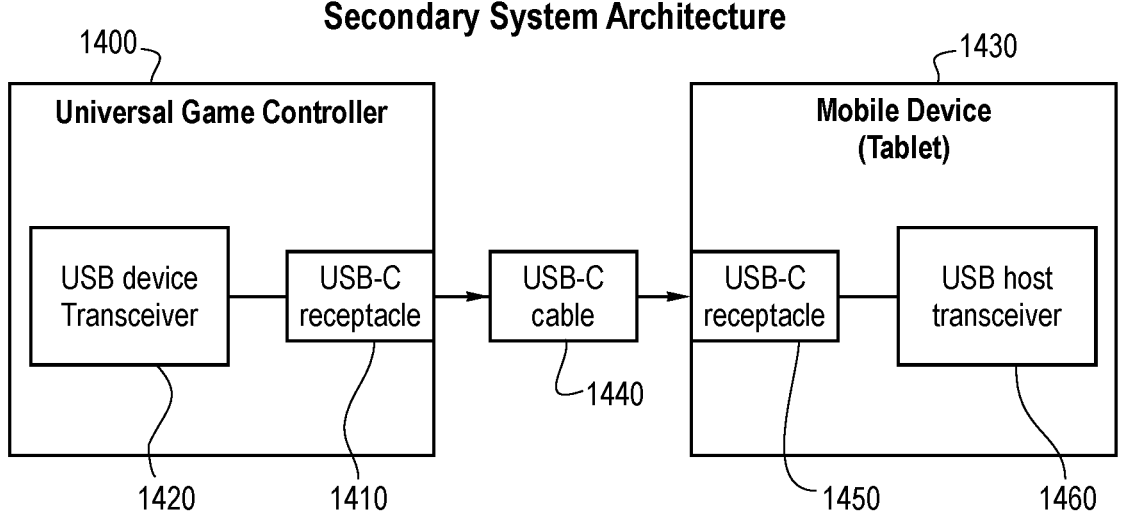
FIG. 14 is an illustration of a secondary system architecture of an embodiment.

In the secondary use case, the game controller is shown below connecting to a different class of mobile device, in this case a tablet. FIG. 14 is an illustration of a secondary system architecture of an embodiment. As shown in FIG. 14, in this architecture, a universal game controller 1400 is connected with a mobile device 1430 via a USB-C cable 1449. The universal game controller 1400 comprises a USB-C receptacle 1410 and a USB device transceiver 1420. The mobile device 1430 comprises a USB-C receptacle 1450 and a USB host transceiver 1460.

Figure 15:
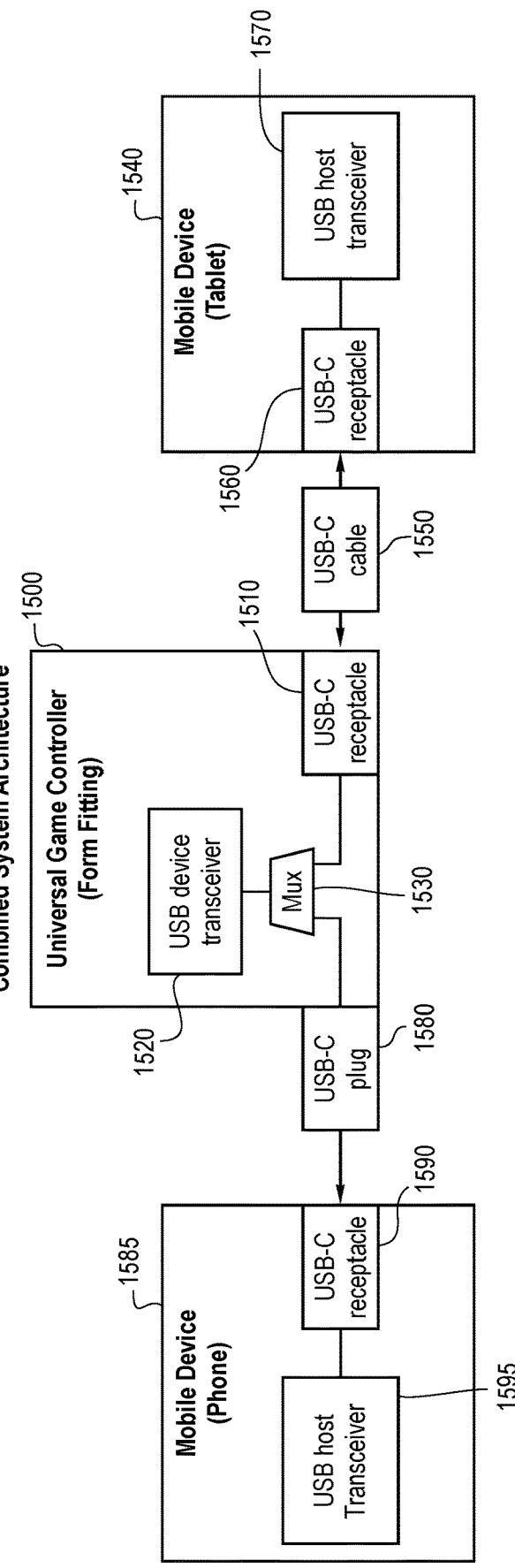
FIG. 15 is an illustration of a combined system architecture of an embodiment.

In a particular embodiment, the two use cases are combined in a single architecture. FIG. 15 is an illustration of a combined system architecture of an embodiment. As shown in FIG. 15, in this architecture, a universal game controller 1500 comprises a USB-C receptacle 1510, a USB device transceiver 1520, a multiplexor 1530, and a USB-C plug 1580. The USB-C plug 1580 connects the universal game controller 1500 with a mobile phone 1585 that comprises a USB-C receptacle 1590 and a USB host transceiver 1595. Also, a USB-C cable 1550 connects the universal game controller 1500 with a mobile device 1540 that comprises a USB-C receptacle 1560 and a USB host transceiver 1570.

Hardware Overview

Figure 16:
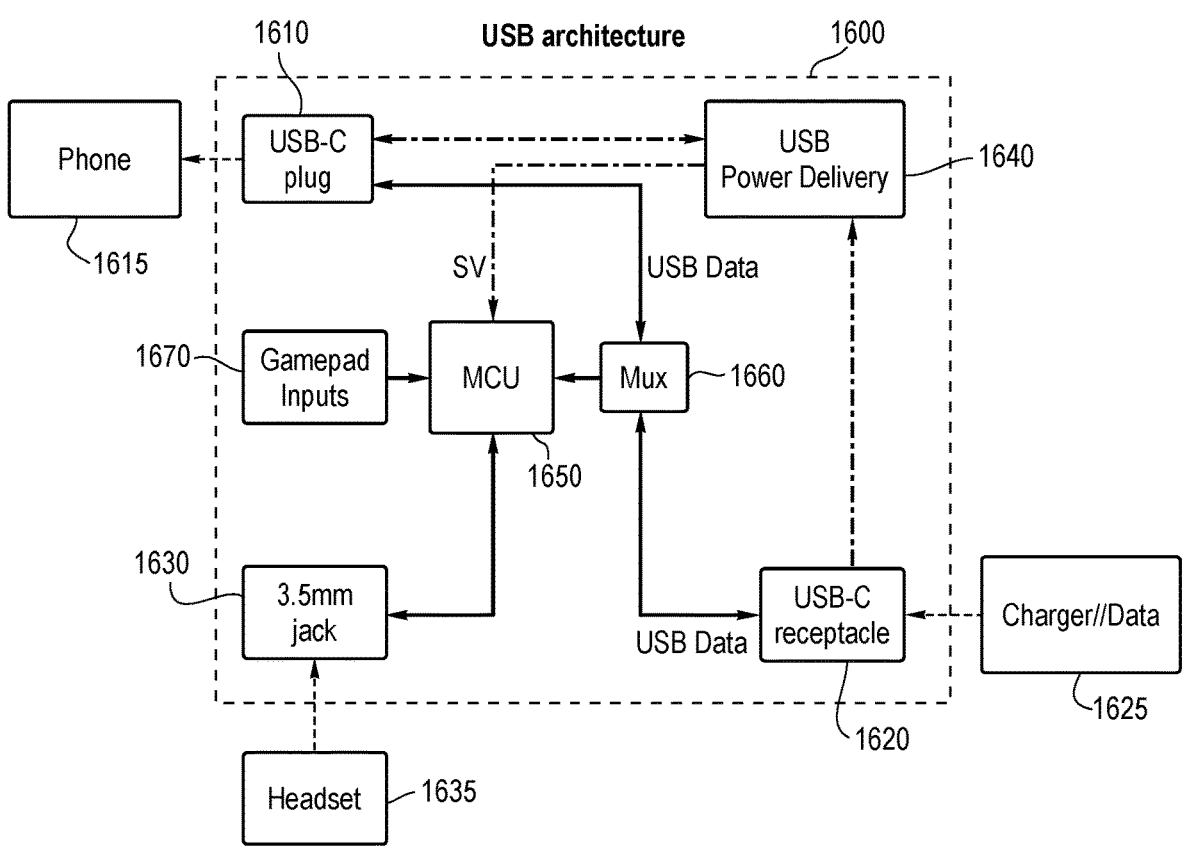
FIG. 16 is an illustration of a universal serial bus (USB) architecture of an embodiment.

A simplified block diagram of a universal serial bus (USB) architecture of an embodiment is shown in FIG. 16. This diagram shows how USB data is multiplexed in the hardware, allowing the embedded system to switch between whether the USB-C plug is active or the USB-C charging receptacle is active. Using USB-C power delivery, the system can intelligently switch power sources and roles, in addition to implementing pass through charging to the phone.

More specifically, as shown in FIG. 16, this architecture 1600 comprises a USB-C plug 1610 that connects with a phone 1615, a USB-C receptacle that connects with a charger/data element 1625, and a jack 1630 that connects with a headset 1635. The architecture 1600 also comprises an MCU 1650, a multiplexor 1660, and game inputs 1670.

Embedded System

Figure 17:
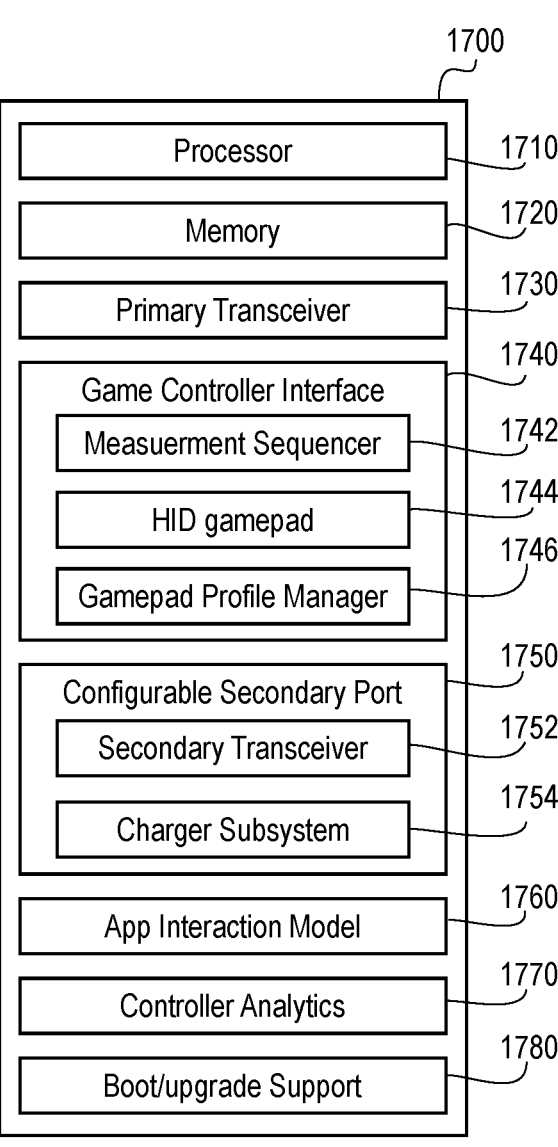
FIG. 17 is an illustration of an embedded system of an embodiment.

FIG. 17 is an illustration of an embedded system 1700 of an embodiment. As shown in FIG. 17, the embedded system 1700 comprises a processor 1710, a memory 1720, a primary transceiver 1730, a game controller interface 1740 (which comprises a measurement sequencer 1742, an HID gamepad 1744, and a gamepad profile manager 1746), a configurable secondary port 1750 (which comprises a secondary transceiver 1752 and a charger subsystem 1754), an application interaction model 1760, a controller analytics element 1770, and boot/upgrade support element 1780. In this diagram, the different blocks in the embedded system 1700 are used to implement an embodiment. The primary and secondary transceivers 1730, 1752 in this case are USB and are actually sharing the same internal USB hardware. The game controller interface 1740 implements a HID gamepad 1744 that can be dynamically reconfigured to target different USB hosts through profiles. Lastly, the embedded system 1700 has several secondary blocks which are used when interacting with the app on the smartphone.

Figure 18:
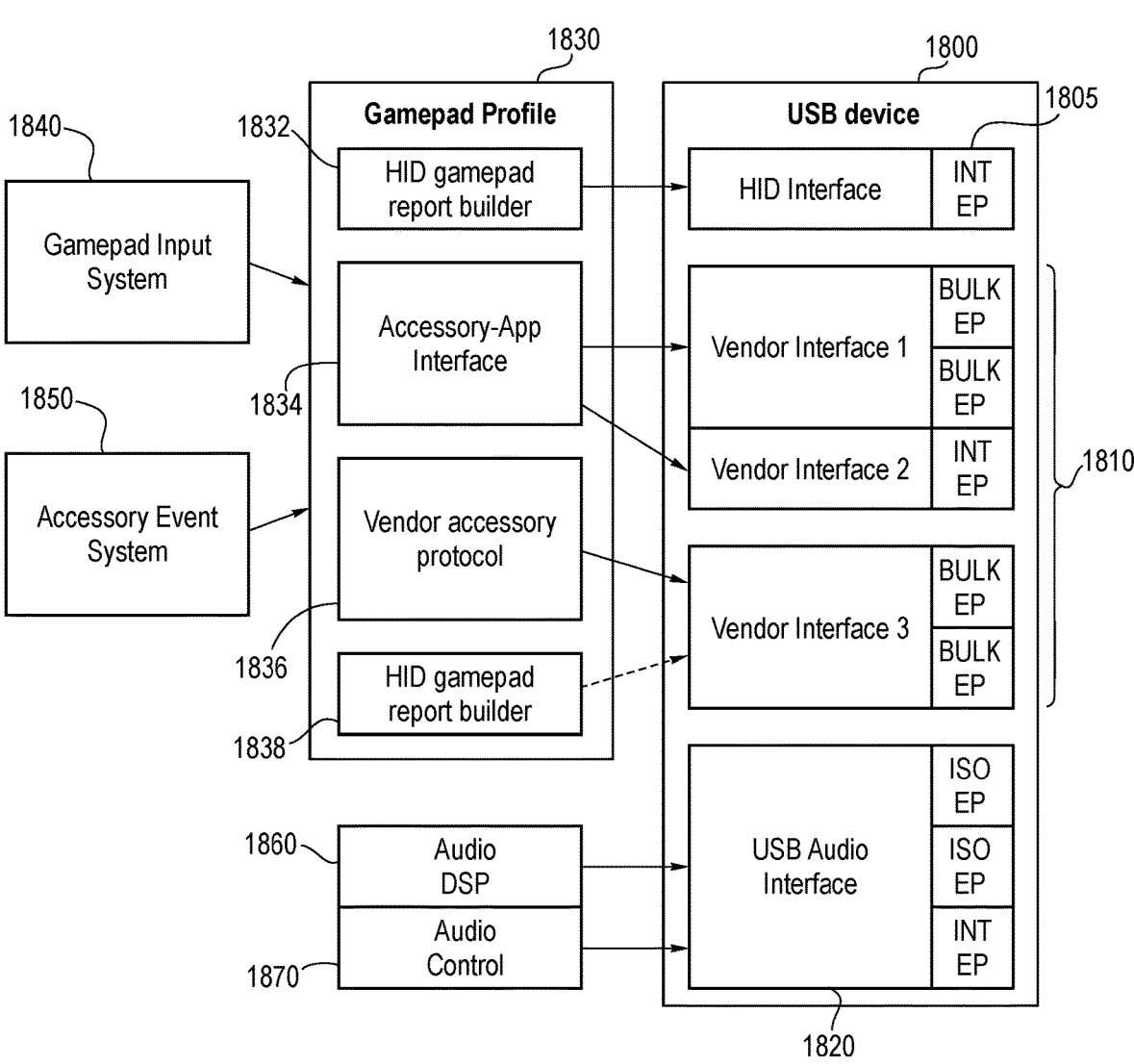
FIG. 18 is a data flow diagram of an embodiment.

FIG. 18 is a data flow diagram of an embodiment. FIG. 18 shows a USB device 1800, a gamepad profile 1830, a gamepad input system 1840, and an accessory event system 1850. The USB device 1800 comprise an HID interface 1805, various vendor interfaces 1810, and a USB audio interface 1820, which accepts audio DSP 1860 and audio control 1870 inputs. The gamepad profile 1830 comprises an HID gamepad report builder 1832, an accessory-app interface 1834, a vendor accessory protocol element 1836, and an HID gamepad report builder 1838. In this diagram, the flow of data is visualized, showing which USB interfaces are used for the various functions of the controller. In the accessory-app interface 1834, custom controller buttons and other system events are packaged up and sent on to the vendor interface 1810 via bulk endpoints. For the vendor accessory protocol 1836, the protocol is initiated automatically once the USB host responds to the start message sent via another vendor interface.

Accessory-App Architecture

Figure 19:
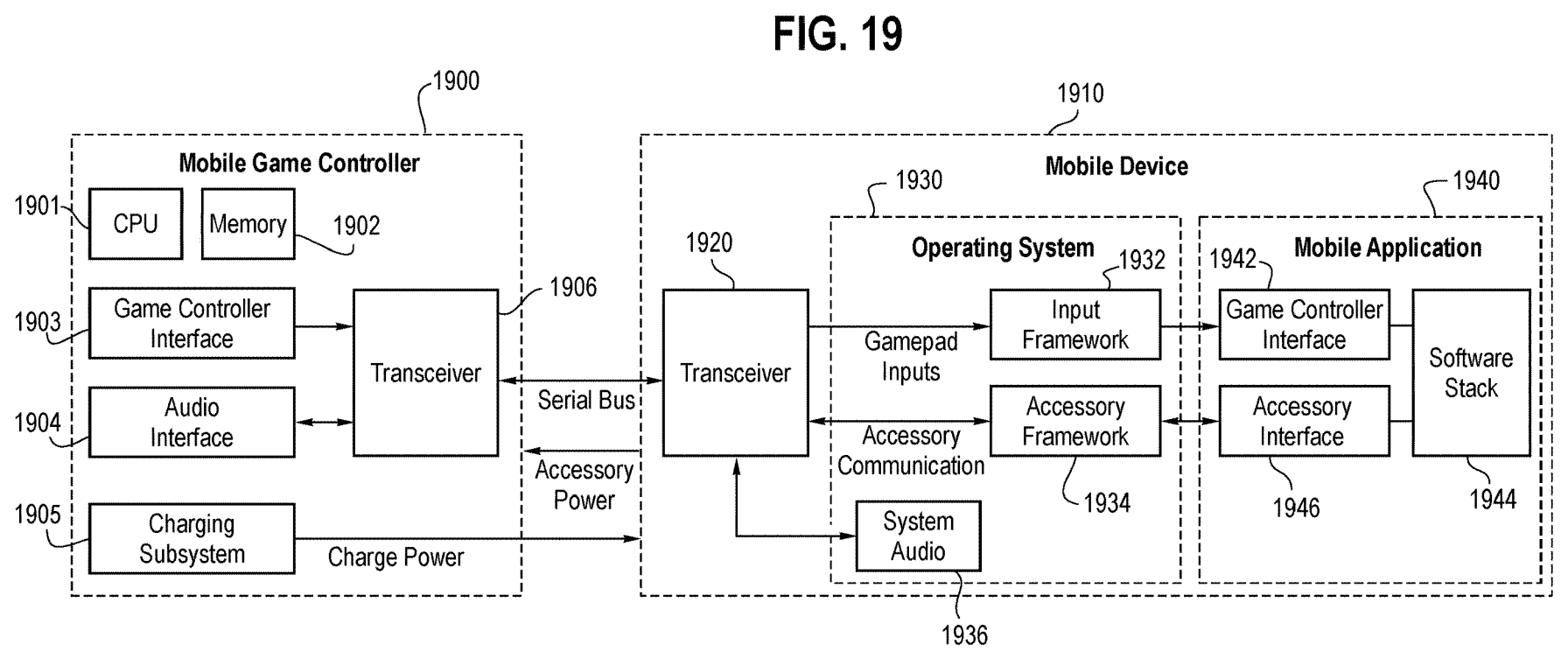

FIG. 19 is an illustration of an accessory-app architecture of an embodiment. This is a subset of the architecture focused on how controller inputs, audio, and accessory messages flow through the system. This diagram is more focused on the paths within the mobile computing device, with the game controller side being a bit more generalized. As shown in FIG. 19, this architecture comprises a mobile game controller 1900 and a mobile device 1910. The mobile game controller 1900 comprises a CPU 1901, a memory 1902, a game controller interface 1903, an audio interface 1904, a charging subsystem 1905, and a transceiver 1906. The mobile device 1910 comprises a transceiver 1920, an operating system 1930, and a mobile application 1940. The operating system 1930 comprises an input framework 1932, an accessory framework 1934, and system audio 1936. The mobile application 1940 comprises a game controller interface 1942, a software stack 1944, and an accessory interface 1946.

USB Device

In one embodiment, the controller operates as a USB device (rather than USB host). This is primarily due to the bus-powered nature, but also because this is the typical role for USB input peripherals. The USB descriptors include the following interfaces:

HID interface(s)
  Audio control interface
  Audio input interface
  Audio output interface
  Bulk in interface(s)
  Bulk out interface(s)
  Interrupt interfaces(s)

Since the device implements multiple class interfaces, we consider this a composite device. In simple terms, a composite device is a device with multiple functions. For example, when connected to a PC, you would see not only a human interface device connected, but also an audio device connected, both of which are grouped within a composite device collection. In addition, the descriptor below includes audio interfaces, but audio is optional for purposes of the embodiments. However, the automatic detection of the mobile device is actually quite useful to handle differences in how audio is handled across the major mobile operating systems.

Using a flexible game controller profile system, we are able to support multiple permutations of USB descriptors. In the diagrams below, we show distinct profiles for Android and iOS, and a third profile which is designed to support both simultaneously.

Figure 20:
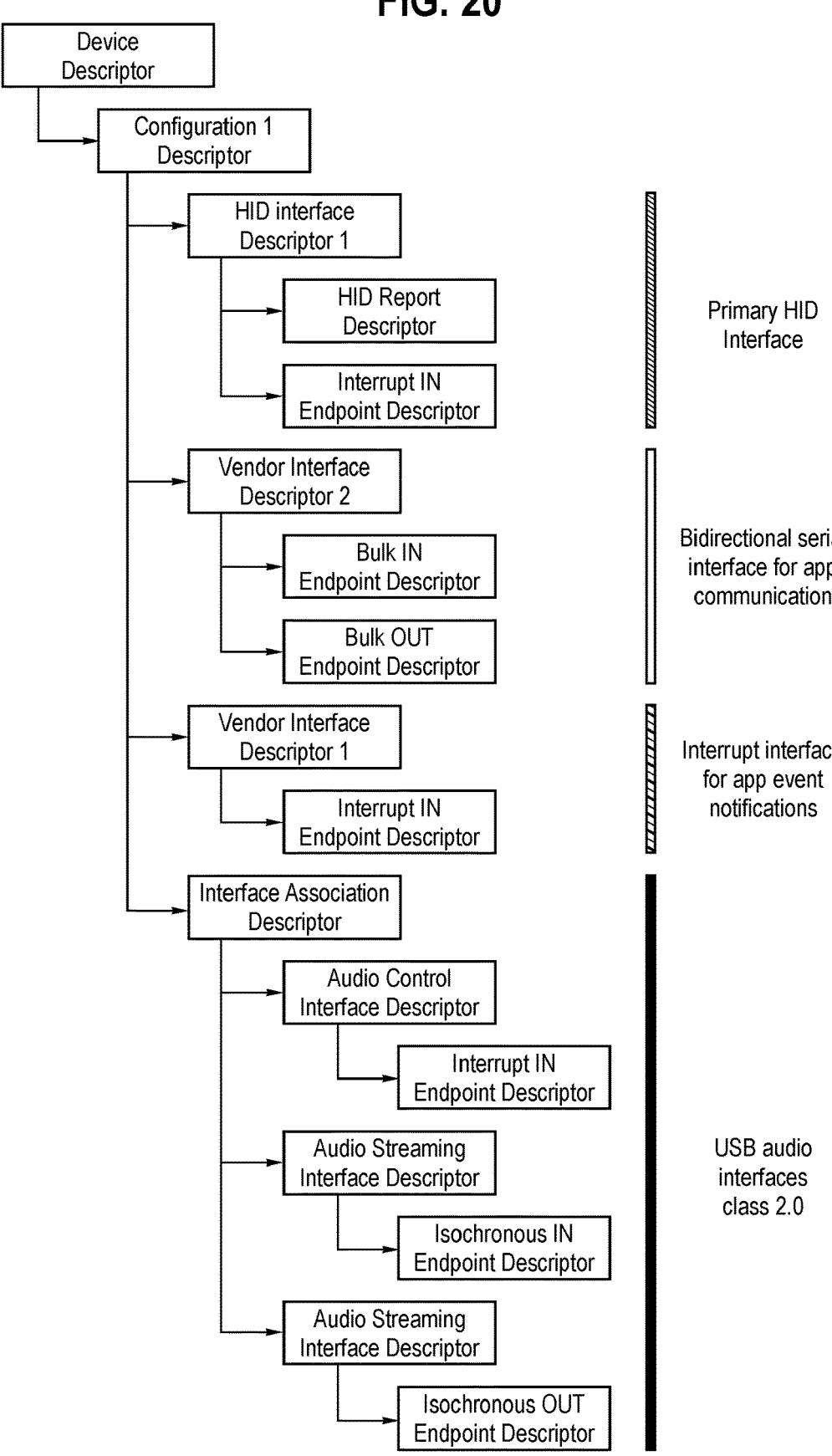
FIG. 20 is an illustration of Android USB device descriptors of an embodiment.
Figure 21:
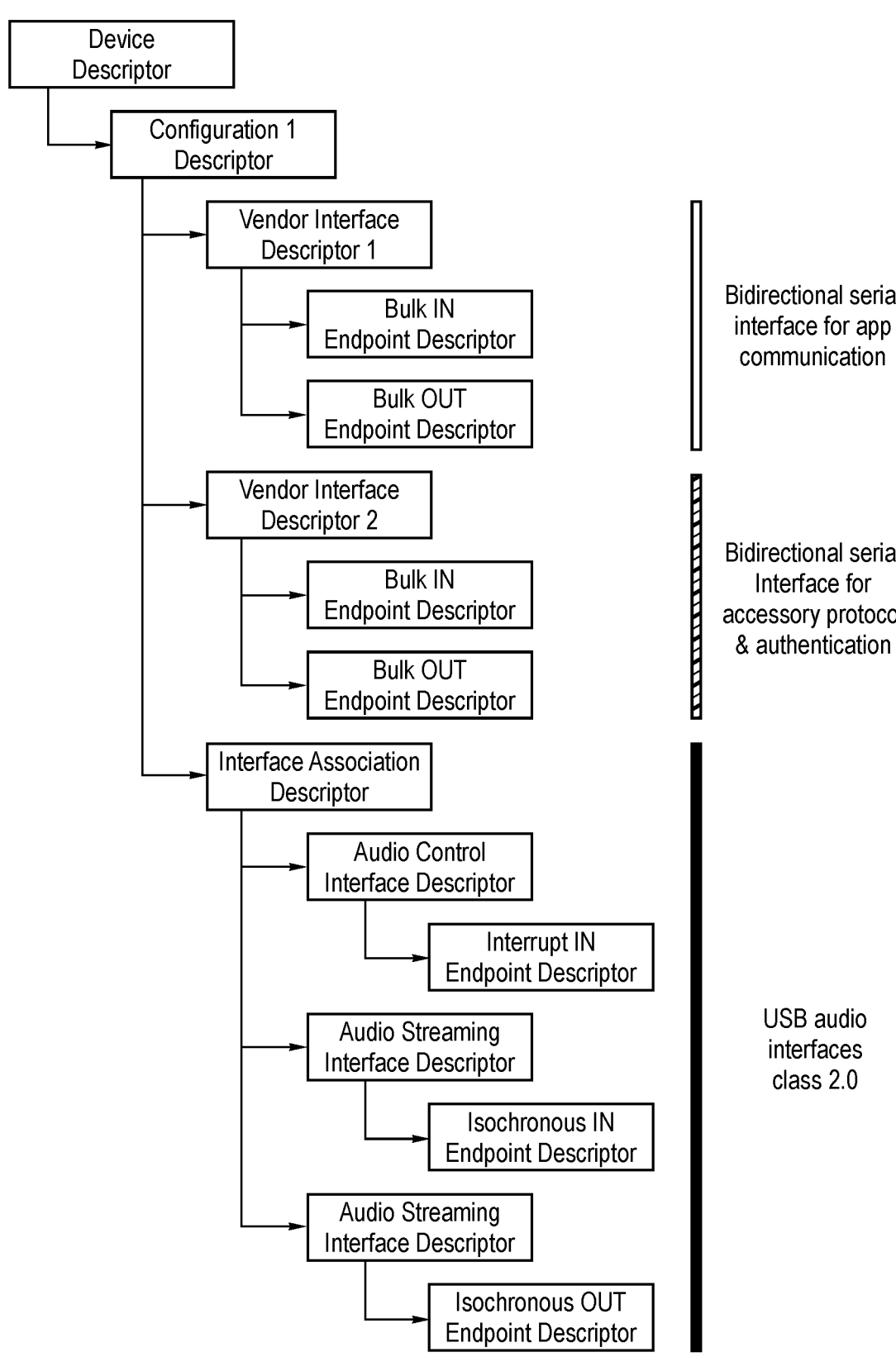
FIG. 21 is an illustration of iOS USB device descriptors of an embodiment.
Figure 22:
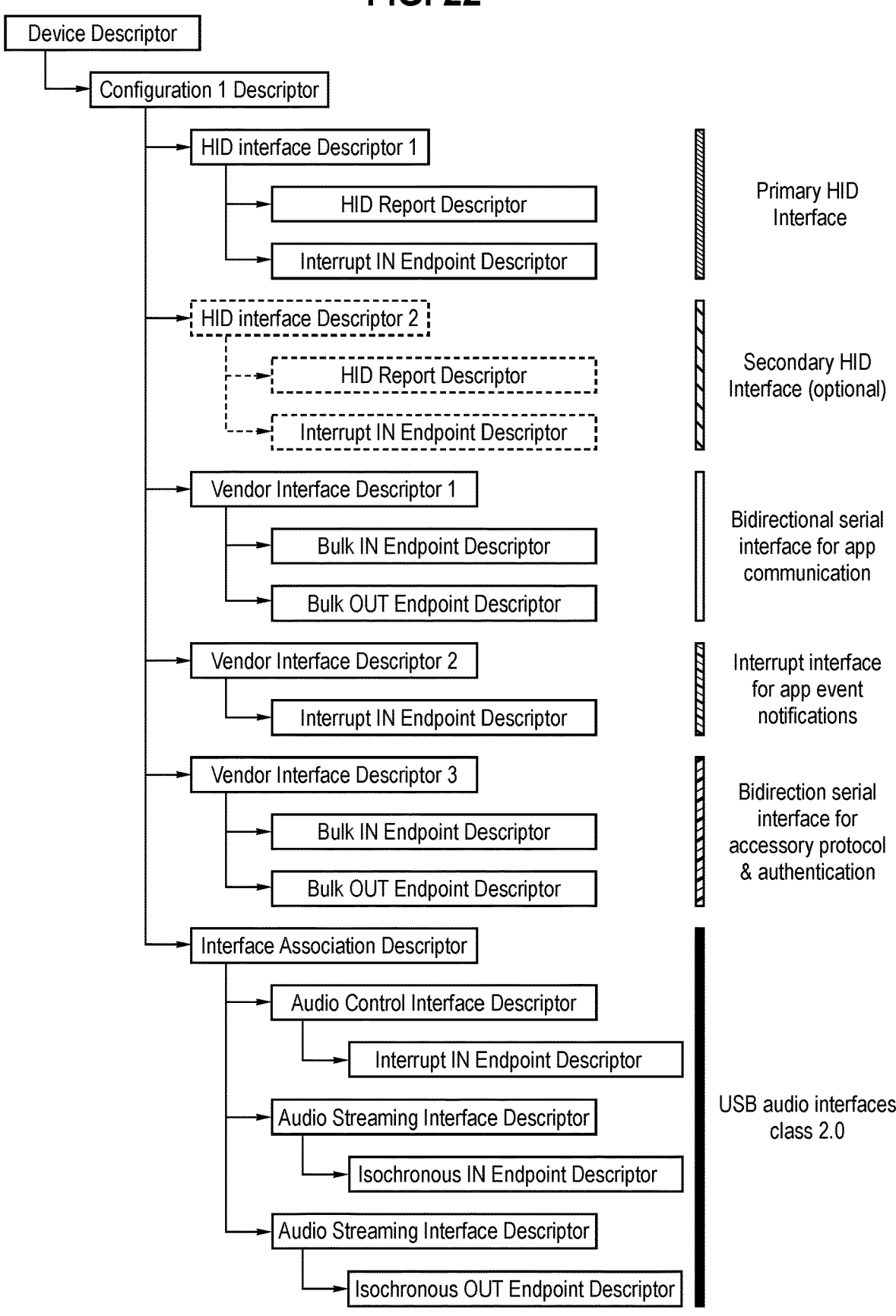
FIG. 22 is an illustration of full device descriptors of an embodiment.

FIG. 20 is an illustration of Android USB device descriptors of an embodiment. FIG. 21 is an illustration of iOS USB device descriptors of an embodiment. FIG. 22 is an illustration of full device descriptors of an embodiment.

HID Interfaces

One element of the universal mobile game controller is the ability to expose multiple HID interfaces. Each mobile device may have its own set of requirements and button mappings for HID game controllers, and therefore having multiple HID interfaces can allow for correct button mappings per platform. Although USB does attempt to standardize HID usage values, it leaves the interpretation of various game controller buttons up to the host. As a result, each platform has a slightly different HID report descriptor to make game controllers work properly.

HID interfaces can either be presented through a standard USB interface with the HID class identifier, or can be established through a vendor interface via a custom accessory protocol. The custom accessory protocol can also be used to specify which USB HID interface to use in the event there are multiple included in the USB device configuration. In this alternate embodiment, the primary HID interface would be used for an unauthenticated game controller, and a secondary HID interface would be used for an authenticated game controller. The secondary HID interface only gets utilized once a vendor message is exchanged to specify the interface number of the desired interface.

Vendor Interfaces

The automatic aspect of the universal mobile game controller is partially achieved through vendor interfaces. In USB, a vendor interface is just a standard interface with a vendor class identifier. On most USB hosts, unknown vendor protocols are generally ignored unless a specific device driver is installed in the system. This behavior can be used to expose a superset of required host functionalities without negatively affecting the core device support. For example, a vendor interface can be used to implement a host specific accessory protocol which is required for one platform, but ignored on the other.

In some embodiments, vendor interfaces can be reused across host platforms. For example, the vendor interface for establishing bulk data communication between the mobile game controller and mobile application can be reused because this paradigm can be easily implemented by multiple platforms. By sharing the USB interface and endpoints in this case, the total number of endpoints in use can be reduced, freeing up resources for host specific interfaces and endpoints.

Audio Interfaces

In some embodiments, the mobile game controller can expose USB audio capabilities on top of the existing HID and vendor capabilities. USB audio class support is generally standardized across hosts. However, in certain embodiments, the audio control behaviors can be treated differently. For example, some USB hosts may opt to handle their audio volume differently, such as implement source scaled volume rather than rely on the USB device to scale the volume. In this case, the mobile game controller can use the vendor interfaces to identify which host vendor is connected, and change its behavior accordingly.

In some embodiments, the USB host may not fully support USB audio class 2.0 features. In the event the host does not support the audio connector request for example, the mobile game controller can decide to re-enumerate in a secondary USB configuration that utilizes a reduced set of audio capabilities for better compatibility.

Automatic Switching

In one embodiment, a combined USB descriptor is used which can support both Android and iOS. The primary HID descriptor is designed for use on Android, which falls under the category of unauthenticated game controller described previously. When this same descriptor is seen on iOS, it does not get immediately used because the system requires authentication first. USB vendor interfaces are instead used to authenticate the device and also communicate the details of the game controller. The controller will attempt to initiate a custom protocol with the iOS device on the vendor interface, which will have no effect on Android, but is recognized on iOS. Once the device has completed authentication, it will present a HID descriptor that describes the controller for the iOS platform. Once the device is authenticated and the game controller configuration is accepted, the device knows to switch its internal game controller processing to use the vendor interface instead of the USB HID interface.

USB Host Fingerprinting

In certain embodiments, the detection of the USB host can be achieved by "fingerprinting" the USB host based on the characteristics of its communication. In this context, fingerprinting is referring to identifying characteristics of the USB host behavior in a way that can uniquely identify the host from other hosts. In this alternative approach, the USB device makes a decision during USB enumeration based on various techniques. For example, a certain USB host may make specific or unique USB requests during enumeration that other hosts do not implement. This can be a signal to re-enumerate as a different device variation for that host. Similarly, a USB host may have a very particular behavior or sequence in how it interrogates interfaces. For example, if a USB host requests string identifiers or other relevant descriptors on a custom vendor interface this can imply the host inherently recognizes the interface, and can be used to infer the host's capabilities.

FIG. 23 is an illustration of an Android enumeration sequence 2300 of an embodiment. As shown in FIG. 23, this sequence 2300 comprises getting the device descriptor (act 2310), getting the device qualifier descriptor (act 2320), getting the configuration descriptor (act 2330), getting the string descriptor (act 2340), setting the configuration (act 2350), and getting the report descriptor (act 2360). FIG. 24 is an illustration of an iOS enumeration sequence 2400 of an embodiment. As shown in FIG. 24, this sequence 2400 comprises getting the device descriptor (act 2410), getting the string descriptor(s) (act 2420), getting the configuration descriptor (act 2430), setting the configuration (act 2440), getting the string descriptor(s) (act 2450), and initiating custom protocols (act 2460). These diagrams show the differences between host enumeration patterns.

In the Android enumeration case, there is a device qualifier descriptor request before the configuration descriptor is requested. This gives the USB device the opportunity to set up a specific configuration descriptor ahead of time. In the event the device qualifier descriptor is not requested, the device will default to the iOS based configuration. This particular approach is desirable since it technically does not require the USB device to restart or re-enumerate.

For the above embodiment, the USB device can use more compact versions of its descriptors, which are more or less a subset of the combined superset descriptors.

In another example, a Windows and Mac USB host enumeration sequence can be compared. FIG. 25 is an illustration of a Windows enumeration sequence 2500 of an embodiment. As shown in FIG. 25, this sequence 2500 comprises getting the device descriptor (act 2510), getting the string descriptor(s) (act 2520), getting the configuration descriptor (act 2530), setting the configuration (act 2540), getting the string descriptor(s) (act 2550), setting the audio interface (act 2560), and getting the report descriptor (act 2570). FIG. 26 is an illustration of a Mac enumeration sequence 2600 of an embodiment. As shown in FIG. 26, this sequence 2600 comprises getting the device descriptor (act 2610), getting the string descriptor(s) (act 2620), getting the configuration descriptor (act 2630), setting the configuration (act 2640), getting the string descriptor(s) (act 2650), getting the report descriptor (act 2660), and setting the audio interface (act 2670).

In this example, the initial sequence between Windows and Mac are very similar. However, later in the sequence there is a difference in when the audio interfaces are requested relative to the HID report descriptor request. This gives the device an opportunity to dynamically swap out the HID report descriptor content based on what sequence of requests is encountered. In this example, the length of the HID report descriptor has to be declared early on when the configuration descriptor is read. Therefore, the descriptor length has to be the same for Windows and Mac. This can be worked around by manipulating the HID report descriptor by adjusting the organization of fields within the descriptor. For example, adding in padding bits or explicitly declaring field sizes can increase the size artificially to match the size requirements.

Secondary Port

In some embodiments, the game controller can be manually reconfigured into a specific profile for use with non-mobile devices such as a PC, or any platform that does not fully conform to the paradigms described above. Although the unauthenticated game controller could still be made to work with a PC via button remapping, there is still value in arranging the button inputs based on the platform.

In this embodiment, the secondary USB port can be reconfigured as a static, non-automatic game controller profile that targets a single platform. The specific profile can be selected through commands exchanged through one of the vendor interfaces. This command exchange can either be done in advance, such as through a smart phone app using the primary connector, or can be configured directly on the target platform by an app. In such an embodiment, the universal game controller logic is itself a setting in a configurable profile system.

Figure 27:
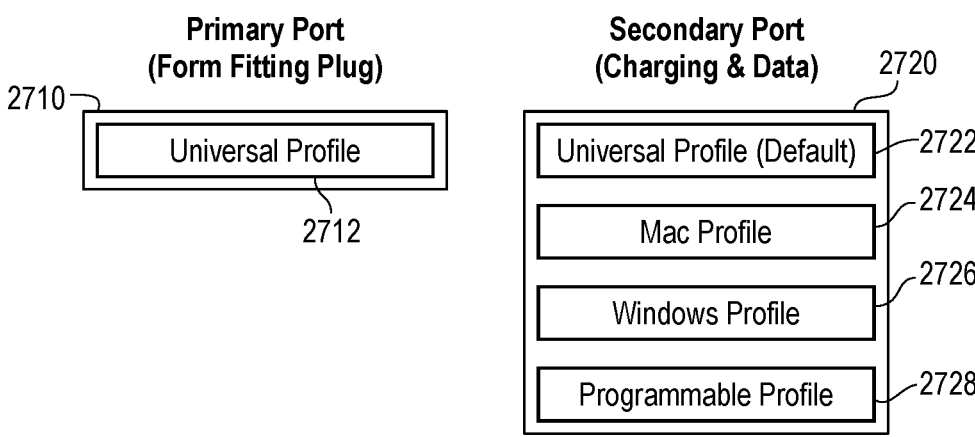
FIG. 27 is an illustration of primary and secondary ports of an embodiment.

FIG. 27 is an illustration of primary and secondary ports 2710, 2720 of an embodiment. The primary port 2710 comprises a universal profile 2712, and the secondary port 2720 comprises a default universal profile 2722, a Mac profile 2724, a Windows profile 2726, and a programmable profile 2728. In this arrangement, the primary port 2710 is automatically configured for use with mobile operating systems, and the secondary port 2720 is user configurable. By default, the universal profile can be used to expand support to Android and Apple tablets, which share compatibility with their phone equivalents. However, the user may want to enable other kinds of devices which can be achieved by switching the profile setting within the device. The configurable port can be set to one of many options, one of which being a completely flexible profile that can be programmed dynamically.

In some embodiments, a programmable profile is implemented which allows for the USB device descriptors to be written dynamically by an application and stored into persistent memory. This allows for additional support of new USB host platforms in the future, and largely eliminates any memory limitations caused by a large number of profile permutations.

Figure 28:
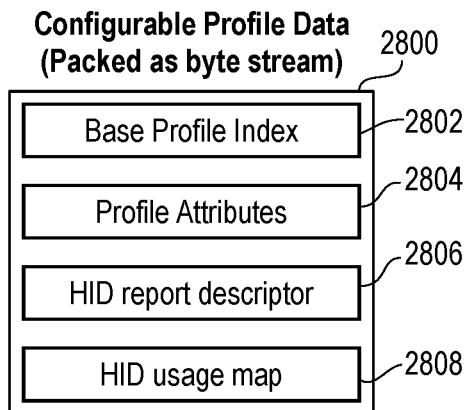
FIG. 28 is an illustration of configurable profile data of an embodiment.

FIG. 28 is an illustration of configurable profile data 2800 of an embodiment. In this arrangement, there are four sections of the profile data which get transmitted from the mobile application and written into the USB device:

Base Profile Index 2802—Specifies which base profile to use for this custom profile. Usually this is a standard HID game controller, but could also point to any other built-in profiles such as universal, windows, mac, etc.

Profile Attributes 2804—Specifies attributes of the game controller such as controller input rate, joystick deadzone, etc.

HID report descriptor 2806—Specifies the report descriptor to present when enumerating over USB (or custom protocol).

HID usage map 2808—Specifies how the physical controller inputs of the product map to the usage values presented in the HID report descriptor.

Physical Switch

In some embodiments, the product may have a physical switch or button to alternate between support game controller profiles. Leveraging the same profile system that is used for the secondary port, this can also be applied to the primary port. In this embodiment, there would be a physical switch on the product such as a two-position slide switch. When the position of the switch changes, the controller will load a different profile (e.g. Android to the left, iOS to the right).

In other embodiments, the product may opt to reuse an existing controller button rather than adding a switch. In this case, the user would hold the button down (for example a specific directional pad button) while connecting their phone which can inform the controller which profile to use at startup.

USB Audio Volume

As a side effect of the automatic detection of the host device, the controller can also apply this knowledge to other aspects of the USB device such as audio. For example, on Android the USB audio implement is non-standard in that it does not use standard volume messages and, instead, scales the content based on the volume level. However, on an iOS device, the host does not scale the content and instead uses standard volume messages to have the USB device apply the attenuation. This difference in volume behavior makes it difficult to build a product that works well for both. If you applied volume control on the device side on Android, the attenuation would be twice as strong because both sides of the system are scaling for volume.

To address this, the outcome of the automatic switching behavior can be used to inform the USB device what it is connected to. So, if the device determines it is connected to an Android device, it can disable its own volume scaling so as to not interfere with the phone's built in volume scaling. Conversely, if it detects an iOS device, it can continue to use the standard USB audio volume behavior where the device applies its own volume scaling. Usually, you want to implement volume scaling on the device doing the audio rendering for highest quality, but not all USB hosts operate this way.

USB Connector Support

For USB audio, there are multiple versions of the USB audio class that can be supported by the host. USB audio 1.0 is the baseline and is widely supported. However, USB audio class 2.0 is not quite as ubiquitous. One convenient feature of USB audio class 2.0 is the ability to implement an audio connector. This connector mechanism allows for the USB device to dynamically turn its audio support on/off based on the presence on the connector. For example, you would only want audio to stream out of the phone when a 3.5 mm jack is plugged in. If the jack was unplugged, you would want the audio to stream from the phone's speaker.

Unfortunately, some phones do not support the USB audio connector feature. In this situation, the phone will always route audio to the USB device regardless of the audio jack state. To a user, this is very confusing because the audio is not heard despite no headphones plugged in. To address this, a process was established which allows the USB device to infer whether the audio support is available.

When the USB device is first connected, it will use the interrupt endpoint associated with this audio connector control, and wait for the USB host to inquire about the connector state. If the USB host does not send a request within a couple hundred milliseconds, the device can infer that USB audio 2.0 is not fully supported and can reboot into a mode which omits USB audio from the descriptors entirely. When the audio jack is plugged in however, the USB device can reboot into its original audio mode to restore audio functionality. In addition, to prevent extra switching, the USB device can remember the last USB host it was connected to. So if the last time it was connected was on a phone without USB audio 2.0 support, it can boot up in the appropriate state to reduce an extra reboot. Of course, any time the audio jack is plugged in, we always need to load the full audio descriptors.

Figure 29:
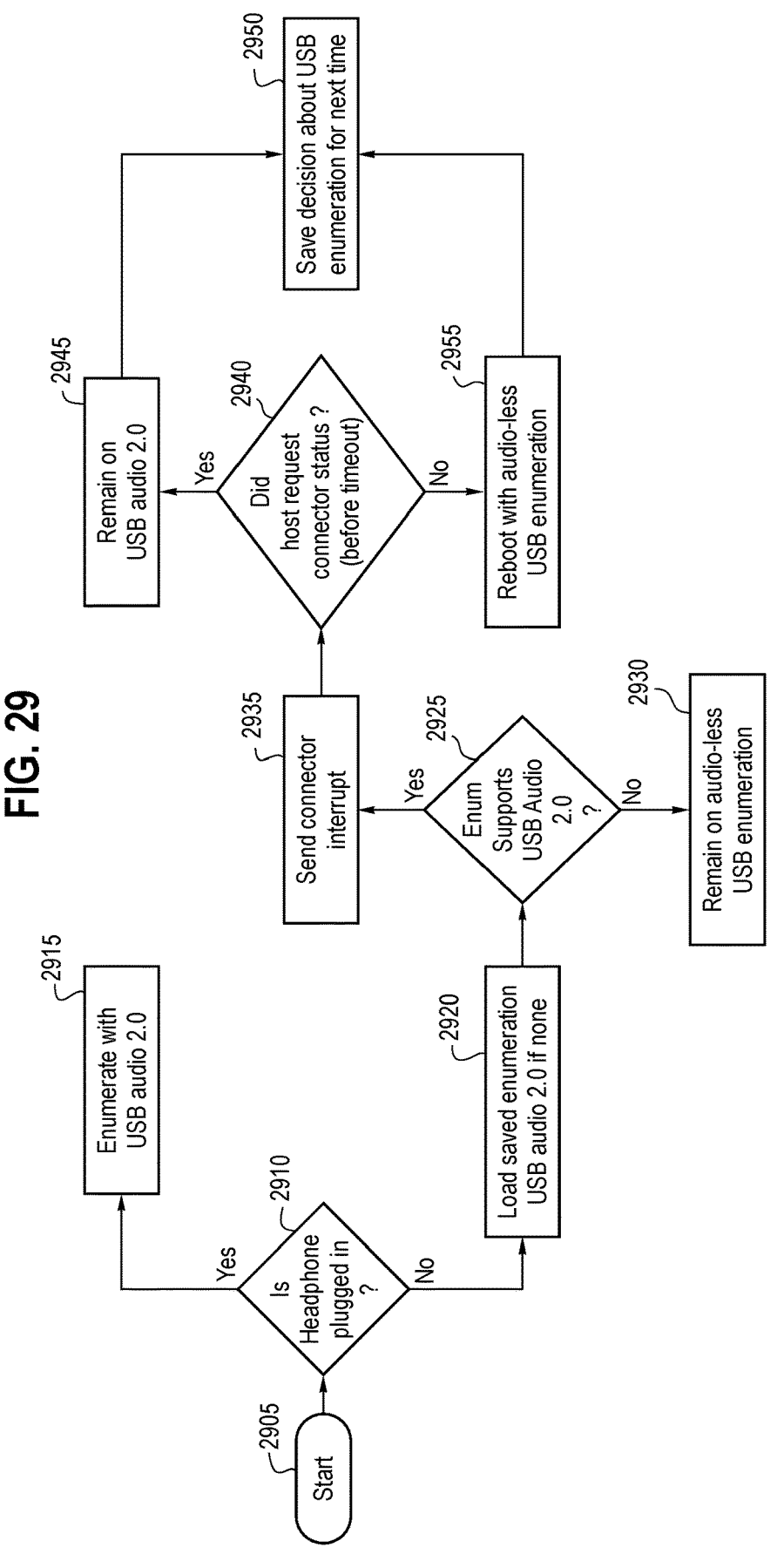
FIG. 29 is a flow chart of a method for USB audio switching of an embodiment.

FIG. 29 is a flow chart 2900 of a method for USB audio switching of an embodiment. As shown in FIG. 29, after the method starts (act 2905), a determination is made on whether a headphone is plugged in (act 2910). If a headphone is plugged in, the device is enumerated with USB audio 2.0 (act 2915). If a headphone is not plugged in, a saved enumeration is loaded, or USB audio 2.0 is used if there is no saved enumeration (act 2920). Next, a determination is made on whether the enumeration supports USB 2.0 audio (act 2925). If the enumeration does not support USB audio 2.0, the device remains on an audio-less USB enumeration (act 2930). However, if the enumeration does support USB audio 2.0, a connect interrupt is sent (act 2935). Then, a determination is made on whether the host requested connector status before timeout (act 2940). If it did, the device remains on USB audio 2.0 (act 2945); otherwise, the device is rebooted with audio-less USB enumeration (act 2955). Either way, a decision about USB enumeration is saved for next time (act 2950).

There are several advantages associated with these embodiments. Some advantages include automatic switching between Android and iOS allowing for a single product to be used for both platforms which greatly reduces customer confusion, especially when the USB-C connector is common between the phone vendors.

ADDITIONAL EMBODIMENTS

In one embodiment, in an effort to automatically support several kinds of USB host platforms (e.g., Mac, IOS, Android, etc.), a detection mechanism can be used to identify the host. Unfortunately, there is no feature of USB that specifically enables identification of a host. However, as discussed above, it is possible to "fingerprint" a host based on its request patterns. If the question is purely "Is it an Android device or is it an iOS device?", in one embodiment, the following two mechanisms can be used: (1) if the host communicates on the custom vendor interface used for iAP2, it is an Apple device; otherwise it is an Android device; or (2) if the host requests the device qualifier descriptor, it is likely an Android device. However, mechanism (1) can return the result of the detection quite late and, as such, may not allow for descriptor customization. So, mechanism (2) may be preferred, as it obtains the host identification early enough where a last-minute descriptor change can be made to take effect.

The approach of fingerprinting over USB can take the form of recording the sequence of USB requests into an array, then comparing against a known sequence or set of criteria. There are a few different points in time where the host can be potentially identified. For a HID game controller, two convenient places to identify the host are during the Get Configuration Descriptor and Get HID Report Descriptor requests. When the USB host requests the configuration descriptor, this is the first time we are responding with data referencing a HID interface. In this case, the length of the HID report descriptor is declared within the configuration data, but the HID report descriptor contents are not yet transmitted. Once the host reaches the point of reading the HID report descriptor, it already knows the expected length of the descriptor, and this is the last opportunity for the device to make changes to the game controller HID. With these two decision points in mind, many of the sources of evidence for the fingerprint are based on the sequence of other requests, and often relative to the configuration or report descriptor requests. Examples of notable USB requests are: Get device descriptor, Get device qualifier descriptor, Get string descriptor, Get report descriptor, Set configuration, Set idle, Set interface, and other Class requests.

These embodiments take advantage of the fact that different USB host platforms have different USB communication patterns. For example, for Apple devices, iOS and iPadOS are almost identical, and Mac is not too different, but does not support the same accessory protocols. Essentially, all Apple devices request the various device descriptor strings (product name, manufacturer name, and serial number) prior to reading the configuration descriptor. When reading strings, a short two-byte request happens first to know how long the string is. The subsequent read uses the length from the first request. Between the Set Configuration request and requesting the HID report descriptor, the Apple host appears to request string descriptors for each interface in the configuration descriptor.

For Android, prior to setting the USB address, Android requests the device descriptor with a length of 64. In addition, many Android devices request the device qualifier descriptor between the device and configuration descriptor requests. In contrast to Apple devices, Android does not read device strings prior to reading the configuration descriptor. When requesting string descriptors, Android reads with a length of 255 rather than a two-stage read like other platforms. Finally, prior to requesting the HID report descriptor, Android sends a HID SetIdle class request, which is notably absent on Apple devices.

Windows is similar to Apple enumerations but is fairly distinct from Android and different in a couple of ways to Apple. For example, Windows requests product name and manufacturer name and serial number prior to reading configuration descriptor like Apple. When reading strings, a short two-byte request happens first to know how long the string is. The subsequent read uses the length from the first request. Same as Apple. Between the Set Configuration and Get HID report descriptor requests the Windows host appears to read interface name for every interface in the configuration descriptor. Same as Apple. Prior to requesting the HID report descriptor, Windows usually sends the Get Configuration request (appears to occur after the batch of string reads). Windows requests the device qualifier descriptor, but with less predictable timing than Android, and generally after the configuration descriptor.

Windows also supports a Microsoft-specific descriptor, called a MS OS descriptor. The way this works is that the very first time Windows sees a device it will make a very specific string descriptor read with index 0xEE to determine if the device supports this protocol. If it does, it will follow up and request the MS OS descriptor contents. If the string descriptor read fails, it will remember this result and never ask again. Since this behavior is unique to Windows, it is a strong form of evidence to distinguish Windows from other USB hosts.

In another embodiment, the USB host fingerprinting approach is implemented as follows. The USB device records the SETUP packet for key USB requests into a history array which can be referenced later. An example SETUP packet can have the following fields:

| bmRequestType | bRequest | wValue | wIndex | wLength |
|---|---|---|---|---|

The most interesting and consistent requests end up being standard device get or set requests since these occur early on in the USB enumeration process. Since most response data is coming from the USB device itself, it would be redundant to record response data, and, in practice, the SETUP packet is enough. Upon receiving even more specific requests (such as Get Configuration Descriptor or Get HID Report Descriptor), the history array contents can be processed to predict what USB host platform the device is connected to. The fingerprint algorithm is largely concerned with the sequence of USB requests. The algorithm keeps track of whether certain requests precede or secede other requests, and these patterns can be recorded as forms of evidence. Evidence for each USB host platform is recorded such that it can be tallied up at the end. To make the data more interpretable, each type of evidence is given a unique identifier, such that the list of evidence can be organized as a vector, which is the fingerprint. The host platform with the highest evidence is what gets returned (or acted on). In the event the USB host detection result is ambiguous, the device can use whatever is default. When detecting iOS and Android, it may be better to have Android be the default as iOS devices have a high degree of consistency due to a single manufacturer.

In a first-order approach, the host gets detected during the Get Configuration Descriptor request, which gives the USB device an opportunity to swap out the configuration descriptor before responding with data to the host. In one implementation, what gets swapped out is the HID report descriptor length in preparation for when it will be requested later. In a second-order approach, the host can get detected when the HID report descriptor is requested, which, in one example, is the final place where a decision can be made about the controller mapping. Since the length of the descriptor was specified earlier on, making changes to the descriptor contents is more difficult as the number of bytes must match. To make the number of bytes match, the HID report descriptor would need to be manipulated to introduce padding bits or alternate ways of defining HID usages to artificially change the final size.

In another embodiment, a HID report descriptor can be created that satisfies both Android and iOS, but only a subset of the HID usages work on either platform. In order for the USB device to choose the correct HID usage mapping for its game controller elements, the USB host fingerprint can be used to determine which host is connected and, subsequently, which usage map to apply. A convenient place would be when the HID report descriptor is read, as this is the earliest the host could even interpret data coming from the HID device. Instead of swapping out the HID report descriptor, the USB device can supply one combined descriptor and simply update its HID usage mapping. Basically, the USB device internally remaps its gamepad elements based on the host platform that was detected.

This has the advantage of being more robust as there are more USB events that occur before a decision has to be made, and the decision is only choosing how to map the bits, not the meaning of the bits. This also enables a failsafe behavior where the Android or iOS app could manually override the mapping once a connection to the app was made; the app has a 100% reliable sense of what type of phone it is.

The following list of example rules/patterns can be used as evidence by the algorithm. This is not an exhaustive list of all differences, but these are the ones that may occur early enough in the enumeration process to make changes to the descriptors "in-flight".

1. 64-Byte Get Device Descriptor

Android devices ask for a 64-byte descriptor prior to even setting the USB address as a way of knowing the USB protocol version in advance (or possibly work around specific kinds of devices). iOS does not exhibit this behavior. Android will only read the 18-byte descriptor later as it already did a read at the beginning.

2. Two-Stage Get Device Descriptor iOS (and most other platforms) first read 8 bytes of the device descriptor to get the USB protocol version then re-read the descriptor again with the correct length for said version. Most Android devices do not do this.

3. Get Device Qualifier Before Get Configuration Descriptor

Most Android devices request the Device Qualifier prior to reading the configuration descriptor to figure out if the device supports high speed or not. iOS does not utilize the device qualifier descriptor. Other hosts ask for device qualifier, but only Android asks for it so early on.

4. Get Device Qualifier After Get Configuration Descriptor

Similar to the previous evidence type except DQ is received after. It is notably different than the negated form of the previous evidence type, because it implies a Device Qualifier request occurred which may or may not always be the case on all hosts.

5. Never Got Device Qualifier (Before Get Report Descriptor)

This is the case where a device qualifier request is never seen. Usually the determination for this evidence is confirmed once the GetReportDescriptor (HID) is encountered as this is the last place where changes to the USB game controller configuration can be realistically made.

6. Two-Stage Get String Descriptor

Apple devices (and most USB hosts) read strings in a two-transaction process, where first they read two bytes of the string to establish the length of the string descriptor, then follow up with the correct length request to get the entire string. Android does not follow this behavior.

7. 255-Byte Get String Descriptor

Android devices read strings in a single transaction by reading the maximum amount of bytes possible for the string (255 bytes) and then internally extract the meaningful length from the subsequent buffer. Of the hosts tested, Android is the only OS that exhibits this behavior (but maybe not all Android devices)

8. Get Configuration Before Get Report Descriptor

USB hosts that support multiple configurations (seems like mostly PCs do this) tend to ask for the current configuration at some point during the enumeration process, usually before obtaining the HID report descriptor. This may not be useful for Android vs iOS, but it could be useful to specifically detect Windows or Mac.

9. Get String Descriptor Before Get Configuration Descriptor

Some hosts (iOS, Windows, Mac) request string descriptors immediately after reading the device descriptor, and before the configuration descriptor. Presumably, this information is necessary to create an entry for the device in advance of reading its configuration (e.g. look up driver in registry). Android however does not appear to do this.

10. No Get String Descriptor Before Get Configuration Descriptor

Just a negation of the previous evidence type. Strings descriptors are always read, so there are really only two types of behavior here.

11. Set Idle Before Get Report Descriptor

On Android and Windows, the host will send a HID SetIdle request before requesting the HID report descriptor. iOS does not appear to ever issue a SetIdle request, so this must be a behavior needed for certain classes of Human Interface Devices.

The following is an example history buffer. Here, a sequence of SETUP packets is recorded during enumeration. Even with this short subset of events, there are already multiple degrees of evidence, such as the use of two-stage descriptor reads, presence of string reads before the configuration descriptor is requested, and the absence of device qualifier descriptor requests.

| bmRequestType | bRequest | wValue | wIndex | wLength | |
|---|---|---|---|---|---|
| 0x80 | 0x06 | 0x0100 | 0x0000 | 0x0008 | Get Device Descriptor (8 bytes) |
| 0x80 | 0x06 | 0x0100 | 0x0000 | 0x0012 | Get Device Descriptor (18 bytes) |
| 0x80 | 0x06 | 0x0301 | 0x0409 | 0x0002 | Get String Descriptor (2 bytes) |
| 0x80 | 0x06 | 0x0301 | 0x0409 | 0x0044 | Get String Descriptor (68 bytes) |
| 0x80 | 0x06 | 0x0302 | 0x0409 | 0x0002 | Get String Descriptor (2 bytes) |
| 0x80 | 0x06 | 0x0302 | 0x0409 | 0x0028 | Get String Descriptor (40 bytes) |
| 0x80 | 0x06 | 0x0303 | 0x0409 | 0x0002 | Get String Descriptor (2 bytes) |
| 0x80 | 0x06 | 0x0303 | 0x0409 | 0x001E | Get String Descriptor (30 bytes) |
| 0x80 | 0x06 | 0x0200 | 0x0000 | 0x0009 | Get Configuration Descriptor (9 bytes) |
| 0x80 | 0x06 | 0x0200 | 0x0000 | 0x019C | Get Configuration Descriptor (412 bytes) |

In another embodiment, a HID descriptor is created that contains all of the necessary HID usages to support both iOS and Android game controller mappings. By clever organization of the descriptor, and some automatic remapping of the bits, the same HID descriptor can be presented to both iOS and Android instead of attempting to detect the host before it asks for the descriptor.

The following is an example iOS HID Descriptor:
```
UsagePage(GenericDesktop)
Usage(GenericDesktop,Gamepad)
Collection(Application)
   Usage(GenericDesktop,Gamepad)
   Collection(Logical)
      ReportID(GAMEPAD_REPORT_ID)
      Logical(-32767, 32767)
      Physical(-32767, 32767)
      Usage(GenericDesktop, Pointer)
      Collection(Physical)
         ReportSize(16)
         ReportCount(4)
         Usage(GenericDesktop, X)
         Usage(GenericDesktop, Y)
         Usage(GenericDesktop, Z)
         Usage(GenericDesktop, Rz)
         Input(data,var,abs)
      EndCollection
      ReportSize(8)
      ReportCount(2)
      Logical(0, 255)
      Physical(0, 255)
      UsagePage(Button)
      Usage(Button, Button7)
      Usage(Button, Button8)
      Input(data,var,abs)
      ReportSize(1)
      ReportCount(4)
      Logical(0,1)
      Physical(0,1)
      UsagePage(GenericDesktop)
      Usage(GenericDesktop, DpadUp)
      Usage(GenericDesktop, DpadRight)
      Usage(GenericDesktop, DpadDown)
      Usage(GenericDesktop, DpadLeft)
      Input(data, var,abs)
```

```
      ReportCount(4)
      UsagePage(Button)
      Usage(Button, Button1)
      Usage(Button, Button2)
      Usage(Button, Button3)
      Usage(Button, Button4)
      Input(data, var,abs)
      ReportCount(4)
      Usage(Button, Button5)
      Usage(Button, Button6)
      Usage(Button, Button9)
      Usage(Button, Button10)
      Input(data,var,abs)
      ReportCount(5)
      UsagePage(Consumer)
      Usage(Consumer, AcHome)
      Usage(Consumer, AcProperties)
      Usage(Consumer, AcExit)
      Usage(Consumer, Record)
      Usage(Consumer, Snapshot)
      Input(data, var,abs)
      ReportCount(7)
      Input(const,var,abs)
   EndCollection
EndCollection
```

The following is an example Android Descriptor:
```
UsagePage(GenericDesktop)
Usage(GenericDesktop, Gamepad)
Collection(Application)
   Collection(Logical)
      ReportID(GAMEPAD_REPORT_ID)
      ReportSize(16)
      ReportCount(4)
      Logical(-32767, 32767)
      Physical(-32767, 32767)
      Usage(GenericDesktop, X)
      Usage(GenericDesktop, Y)
      Usage(GenericDesktop, Z)
      Usage(GenericDesktop, Rz)
      Input(data, var,abs)
      ReportSize(8)
      ReportCount(2)
      Logical(0, 255)
      Physical(0, 255)
```

```
UsagePage(Simulation)
Usage(Simulation, Brake)
Usage(Simulation, Accelerator)
Input(data, var, abs)
ReportSize(4)
ReportCount(1)
Logical(0,7)
Physical(0,315)
Unit(degrees)
Usage(GenericDesktop, HatSwitch)
Input(data,var,abs,null)
Unit(none)
ReportSize(1)
ReportCount(16)
Logical(0,1)
Physical(0,1)
UsagePage(Button)
UsageMin(Button1)
UsageMax(Button16)
Input(data, var,abs)
ReportCount(3)
UsagePage(Consumer)
Usage(Consumer, Power)
Usage(Consumer, VolumeIncrement)
Usage(Consumer, VolumeDecrement)
Input(data, var,abs)
ReportCount(1)
Input(const,var,abs)
    EndCollection
EndCollection
```

The following is an example of a combined iOS and Android Descriptor:

```
UsagePage(GenericDesktop)
Usage(GenericDesktop,Gamepad)
Collection(Application)
    Usage(GenericDesktop,Gamepad)
    Collection(Logical)
        Logical(-32767, 32767)
        Physical(-32767, 32767)
        Usage(GenericDesktop, Pointer)
        Collection(Physical)
            ReportSize(16)
            ReportCount(4)
            Usage(GenericDesktop, X)
            Usage(GenericDesktop, Y)
            Usage(GenericDesktop, Z)
            Usage(GenericDesktop, Rz)
            Input(data, var,abs)
        EndCollection
        ReportSize(8)
        ReportCount(2)
        Logical(0, 255)
        Physical(0, 255)
        UsagePage(Button)
        Usage(Button, Button7)
        Usage(Button, Button8)
        Input(data, var,abs)
        ReportSize(8)
        ReportCount(2)
        Logical(0, 255)
        Physical(0, 255)
        UsagePage(Simulation)
        Usage(Simulation, Brake)
        Usage(Simulation, Accelerator)
        Input(data, var,abs)
        ReportSize(4)
        ReportCount(1)
```

```
        Logical(0,7)
        Physical(0,315)
        Unit(degrees)
        Usage(GenericDesktop, HatSwitch)
        Input(data,var,abs,null)
        ReportSize(1)
        ReportCount(4)
        Logical(0,1)
        Physical(0,1)
        UsagePage(GenericDesktop)
        Usage(GenericDesktop, DpadUp)
        Usage(GenericDesktop, DpadRight)
        Usage(GenericDesktop, DpadDown)
        Usage(GenericDesktop, DpadLeft)
        Input(data,var,abs)
        ReportCount(16)
        UsagePage(Button)
        Usage(Button, Button1)
        Usage(Button, Button2)
        Usage(Button, Button3)
        Usage(Button, Button4)
        Usage(Button, Button5)
        Usage(Button, Button6)
        Usage(Button, Button9)
        Usage(Button, Button10)
        Usage(Button, Button11)
        Usage(Button, Button12)
        Usage(Button, Button13)
        Usage(Button, Button14)
        Usage(Button, Button15)
        Usage(Button, Button16)
        Usage(Button, Button17)
        Usage(Button, Button18)
        Input(data, var,abs)
        ReportCount(8)
        UsagePage(Consumer)
        Usage(Consumer, AcHome)
        Usage(Consumer, AcProperties)
        Usage(Consumer, AcExit)
        Usage(Consumer, Record)
        Usage(Consumer, Snapshot)
        Usage(Consumer, Power)
        Usage(Consumer, VolumeIncrement)
        Usage(Consumer, VolumeDecrement)
        Input(data, var, abs)
    EndCollection
EndCollection
```

The following are examples of usage maps that would be used by the at least one processor in the controller to map various usages to the user input elements of the controller:
iOS

```
MAP(GamepadButton_JoystickX, Usage(GenericDesk-
    top, X)),
MAP(GamepadButton_JoystickY, Usage(GenericDesk-
    top, Y)),
MAP(GamepadButton_JoystickZ, Usage(GenericDesk-
    top, Z)),
MAP(GamepadButton_JoystickRz, Usage(GenericDesk-
    top, Rz)),
MAP(GamepadButton_L2, Usage(Button, Button7)),
MAP(GamepadButton_R2, Usage(Button, Button8)),
MAP(GamepadButton_DpadUp, Usage(GenericDesktop,
    DpadUp)),
MAP(GamepadButton_DpadRight, Usage(GenericDesk-
    top, DpadRight)),
MAP(GamepadButton_DpadDown, Usage(GenericDesk-
    top, DpadDown)),
```

MAP(GamepadButton_DpadLeft, Usage(GenericDesk-
top, DpadLeft)),
MAP(GamepadButton_A, Usage(Button, Button1)),
MAP(GamepadButton_B, Usage(Button, Button2)),
MAP(GamepadButton_X, Usage(Button, Button3)),
MAP(GamepadButton_Y, Usage(Button, Button4)),
MAP(GamepadButton_L1, Usage(Button, Button5)),
MAP(GamepadButton_R1, Usage(Button, Button6)),
MAP(GamepadButton_L3, Usage(Button, Button9)),
MAP(GamepadButton_R3, Usage(Button, Button 10)),
MAP(GamepadButton_Menu, Usage(Consumer,
AcExit)),
MAP(GamepadButton_Options, Usage(Consumer,
AcProperties)),
MAP(GamepadButton_Record, Usage(Consumer,
Record)),
MAP(GamepadButton_Home, Usage(Consumer,
AcHome)),
MAP(GamepadButton_Screenshot, Usage(Consumer,
Snapshot)),
Android
MAP(GamepadButton_JoystickX, Usage(GenericDesk-
top, X)),
MAP(GamepadButton_JoystickY, Usage(GenericDesk-
top, Y)),
MAP(GamepadButton_JoystickZ, Usage(GenericDesk-
top, Z)),
MAP(GamepadButton_JoystickRz, Usage(GenericDesk-
top, Rz)),
MAP(GamepadButton_L2, Usage(Simulation, Brake)),
MAP(GamepadButton_R2, Usage(Simulation, Accelera-
tor)),
MAP(GamepadButton_L2, Usage(Button, Button9)),
MAP(GamepadButton_R2, Usage(Button, Button10)),
MAP(GamepadButton_Hat, Usage(GenericDesktop,
HatSwitch)),
MAP(GamepadButton_A, Usage(Button, Button1)),
MAP(GamepadButton_B, Usage(Button, Button2)),
MAP(GamepadButton_X, Usage(Button, Button4)),
MAP(GamepadButton_Y, Usage(Button, Button5)),
MAP(GamepadButton_L1, Usage(Button, Button7)),
MAP(GamepadButton_R1, Usage(Button, Button8)),
MAP(GamepadButton_L3, Usage(Button, Button14)),
MAP(GamepadButton_R3, Usage(Button, Button15)),
MAP(GamepadButton_Options, Usage(Button, But-
ton11)),
MAP(GamepadButton_Menu, Usage(Button, Button12)),
MAP(GamepadButton_Screenshot, Usage(Consumer,
Power)),
MAP(GamepadButton_Screenshot, Usage(Consumer,
VolumeDecrement)),
MAP(GamepadButton_Home, Usage(Button, But-
ton13)),
Regarding value differences, in one embodiment, the only shared usages that differ in interpretation is the Y axis on the joysticks. This is inverted between the host platforms. In addition, for compatibility, the Android mapping also has a digital version of the left and right triggers. Since triggers are often expected to be analog, an analog digital conversion can be applied. Thus, the below code can be implemented in a value transformation callback:

```
if (detectedUsbHost == UsbHostPlatform_ANDROID) {
    // Android Y axis is inverted relative to iOS
    if (usage == Usage(GenericDesktop, Y) || usage ==
```

-continued

```
Usage(GenericDesktop, Rz)) {
    return −value;
}
// Convert analog triggers to digital
if (usage == Usage(Button, Button9) || usage == Usage(Button,
Button10)) {
    // Greater than 0.5 is 1, otherwise 0
    return (value > 127) ? 1 : 0;
}
}
```

Several findings may be of interest to these embodiments. For example, Android may get confused when it sees both Usage(GenericDesktop, HatSwitch) and Usage(GenericDesktop, DpadUp) in the same descriptor. However, due to the way the Android code works, if it sees HatSwitch in the descriptor first, it can correctly establish the intended HID usage for AXIS_HAT and issues can be avoided (such as Dpad-up being permanently stuck on). Also, in one example, Button7 and Button8 are analog in the iOS mapping and digital in the Android mapping. However, Android will convert the analog values to digital, so Button7 and Button8 can still work as digital L1/R1 despite being configured with a 0-255 range in the descriptor. Further, Usage(Simulation, Brake), Usage(Simulation, Accelerator), and Usage(GenericDesktop, HatSwitch) are ignored on iOS and are safe to interleave in the descriptor. Additionally, unmapped Button page usages are generally ignored on both platform, but included for future proofing. Both platforms appear to have plans/provisions for extra gamepad buttons in the case new inputs like paddles are added.

Any suitable method can be used to implement any of the alternatives noted above. For example, a process to load a gamepad can be used, where the process can use hybrid HID descriptor. The controller can run a USB host fingerprint algorithm, but rather than make a detection decision when sending the configuration descriptor, the controller can wait until the HID report descriptor is read. Based on the USB host detection result, the controller can select the appropriate button mapping (e.g., Android or iOS). If/when the controller establishes communication with the smart phone app, the USB host platform can be explicitly updated as this can be 100% accurate (e.g., the Android app only runs on an Android phone).

Figure 30:
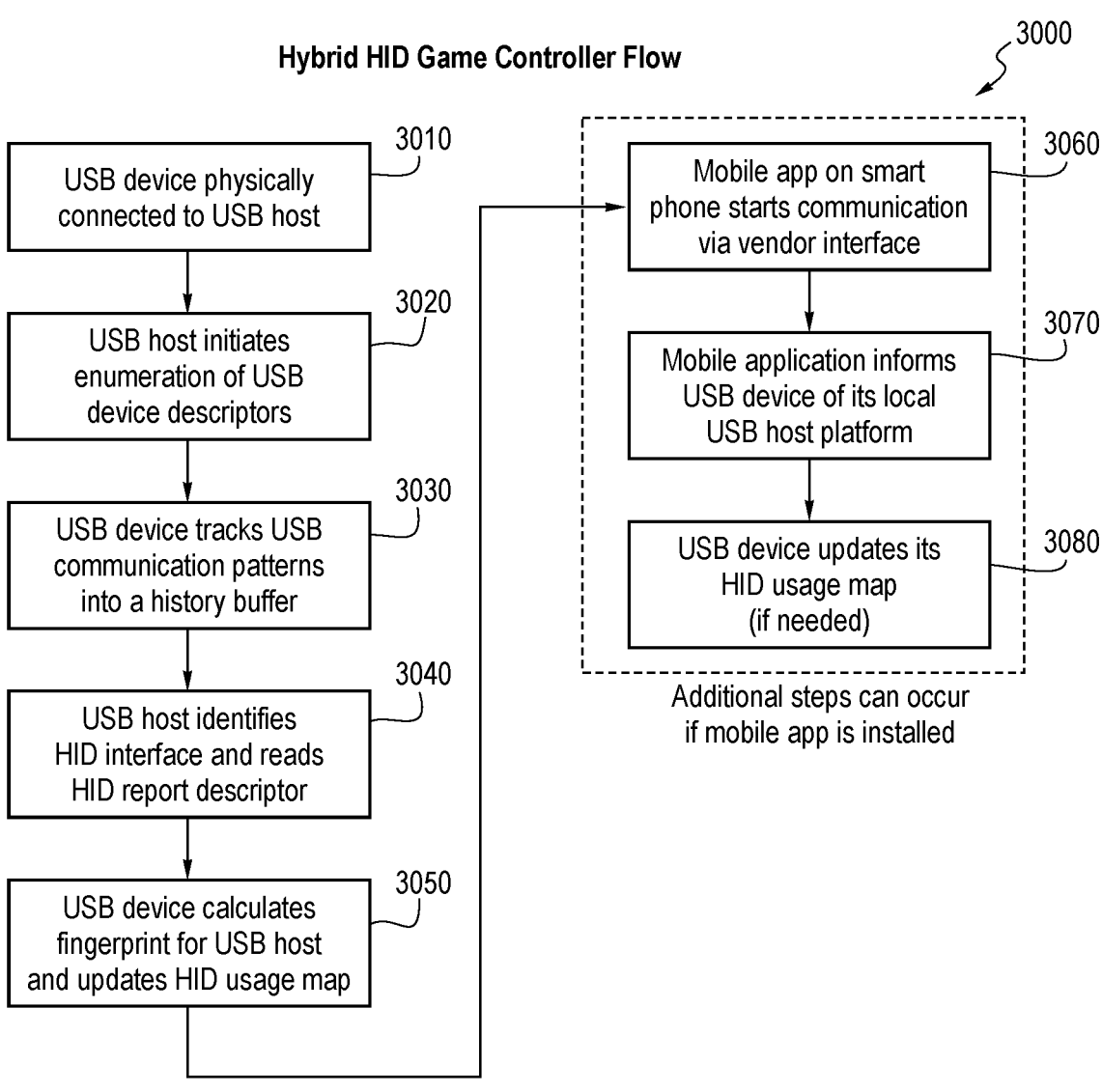
FIG. 30 is a flow chart of a hybrid HID game controller method of an embodiment.

Turning again to the drawings, FIG. 30 is a flow chart 3000 of a hybrid HID game controller method of an embodiment. As shown in FIG. 30, the USB device (e.g., the game controller) physically connects to the USB host (e.g., the phone) (act 3010). The USB host then initiates enumeration of USB device descriptors (act 3020). In response, the USB device tracks USB communication patterns in a history buffer (act 3030). The USB host then identifies the HID interface and reads the HID report descriptor (act 3040). Next, the USB device calculates fingerprints for the USB host and updates the HID usage map (act 3050). If the mobile app is installed in the host, the mobile app can start communication with the USB device via a vendor interface (act 3060) and inform the USB device of the local USB host platform (act 3070). The USB device then updates its HID usage map, if needed (act 3080).

CONCLUSION

It is intended that the foregoing detailed description be understood as an illustration of selected forms that the invention can take and not as a definition of the invention.

It is only the following claims, including all equivalents, that are intended to define the scope of the claimed invention. Finally, it should be noted that any aspect of any of the embodiments described herein can be used alone or in combination with one another.

What is claimed is:

1. A game controller comprising:
at least one processor;
a non-transitory computer-readable medium; and
program instructions stored on the non-transitory computer-readable medium that, when executed by the at least one processor, cause the at least one processor to perform functions comprising:
  receiving a plurality of requests from a host, wherein one of the plurality of requests comprises a request for a human interface device (HID) descriptor;
  sending a single HID descriptor to the host, wherein the single HID descriptor comprises a first subset of information configured for a first operating system and a second subset of information configured for a second operating system;
  analyzing the plurality of requests to determine which of the first and second operating systems is used by the host; and
  selecting a mapping for user input elements of the game controller based on which of the first and second operating systems is determined to be used by the host.

2. The game controller of claim 1, wherein the plurality of requests are analyzed in response to receiving a request to get a HID report descriptor.

3. The game controller of claim 1, wherein the program instructions, when executed by the at least one processor, further cause the at least one processor to perform functions comprising:
  receiving, from a game controller application running on the host, an identification of an operating system actually running on the host;
  determining whether the selected mapping is configured for the operating system actually running on the host; and
  in response to determining that the selected mapping is not configured for the operating system actually running on the host, using a different mapping.

4. The game controller of claim 1, wherein the program instructions, when executed by the at least one processor, further cause the at least one processor to perform functions comprising:
  recording a setup packet for each of the plurality of requests in a history array.

5. The game controller of claim 4, wherein each setup packet comprises one or more of the following fields: bmRequestType, bRequest, wValue, wIndex, or wLength.

6. The game controller of claim 4, wherein requests that indicate that the host uses the first operation system or the second operating system are associated with unique identifiers and a list of unique identifiers is organized as a vector.

7. The game controller of claim 1, wherein the program instructions, when executed by the at least one processor, further cause the at least one processor to perform functions comprising:
  selecting a default operating system in response to the analyzing being inclusive as to which of the first and second operating systems is used by the host.

8. The game controller of claim 1, further comprising a Universal Serial Bus (USB)-C connector configured to connect the game controller with the host.

9. A method comprising:
performing in a universal serial bus (USB) device in communication with a host:
  tracking a plurality of communications received from a host;
  sending a hybrid human interface device (HID) descriptor to the host, wherein the hybrid HID descriptor comprises a plurality of subsets of information configured for a respective plurality of operating systems;
  analyzing the plurality of communications to determine an operating system used by the host; and
  selecting a usage map based on the operating system determined to be used by the host.

10. The method of claim 9, wherein the plurality of communications are analyzed in response to receiving a request to get a HID report descriptor.

11. The method of claim 9, further comprising:
updating the usage map in response to learning, from an application running on the host, that the host is using a different operating system.

12. The method of claim 9, wherein a presence of one or more of the following in the plurality of communications is indicative of the operating system used by the host: a request for a device qualifier descriptor, a request for a string descriptor, a specific sequence of a request for an audio interface and a request for a report descriptor, a request for a 64-byte get device descriptor, or a two-stage get device descriptor request.

13. The method of claim 9, wherein a presence of one or more of the following in the plurality of communications is indicative of the operating system used by the host: a get device qualifier request before a get configuration descriptor request, a get device qualifier request after a get configuration descriptor request, an absence of a device qualifier request before a get report descriptor request, a two-stage get string descriptor request, or a request for a 255-byte get string descriptor.

14. The method of claim 9, wherein a presence of one or more of the following in the plurality of communications is indicative of the operating system used by the host: a get configuration request before a get report descriptor request, a get string descriptor request before a get configuration descriptor request, an absence of a get string descriptor before a get configuration descriptor request, a set idle request before a get report descriptor request, or a request for a Microsoft operating system (MS OS) descriptor.

15. A non-transitory computer-readable medium storing program instructions that, when executed by one or more processors in a mobile game controller, cause the one or more processors to perform functions comprising:
  receiving a plurality of requests from the host;
  sending a descriptor to the host, wherein the descriptor comprises a plurality of subsets of information configured for a respective plurality of operating systems;
  analyzing the plurality of requests to determine an operating system used by the host; and
  internally mapping various gamepad elements of the mobile game controller based on the operating system determined to be used by the host.

16. The non-transitory computer-readable medium of claim 15, wherein the descriptor comprises a human interface device (HID) descriptor.

17. The non-transitory computer-readable medium of claim 16, wherein the plurality of requests are analyzed in response to receiving a request to get a HID report descriptor.

18. The non-transitory computer-readable medium of claim 15, wherein the program instructions, when executed by one or more processors in the mobile game controller, further cause the one or more processors to perform functions comprising:

internally re-mapping the various gamepad elements of the mobile game controller based on learning an actual operating system used by the host.

19. The non-transitory computer-readable medium of claim 15, wherein the mobile game controller comprises a joystick, and wherein the mapping is for movement on a Y axis of the joystick.

20. The non-transitory computer-readable medium of claim 15, wherein the mobile game controller comprises a trigger, and wherein the mapping comprises an analog-to-digital conversion of a signal generated by actuation of the trigger.

\* \* \* \* \*